United States Patent
Tanaka et al.

(10) Patent No.: US 6,897,976 B2
(45) Date of Patent: May 24, 2005

(54) RECORD CONTROL APPARATUS AND RECORDING APPARATUS

(75) Inventors: Souhei Tanaka, Kawasaki (JP); Masafumi Wataya, Kawasaki (JP); Noriyuki Suzuki, Tokyo (JP); Hiroshi Uemura, Machida (JP); Nobuyuki Tsukada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,726

(22) Filed: Jul. 16, 1999

(65) Prior Publication Data

US 2002/0140979 A1 Oct. 3, 2002

(30) Foreign Application Priority Data

Jul. 17, 1998 (JP) .............................. 10-203152

(51) Int. Cl.[7] .............................................. G06K 15/00
(52) U.S. Cl. ....................................... 358/1.17; 358/1.8
(58) Field of Search ..................... 358/1.1, 1.8, 1.13, 358/1.15, 1.16, 1.17, 1.18, 502, 503, 501, 296; 347/180, 181, 182, 211, 247

(56) References Cited

U.S. PATENT DOCUMENTS

| 4,829,421 A | * | 5/1989 | Ritchie | 709/234 |
| 5,490,237 A | * | 2/1996 | Zimmerman et al. | 358/1.15 |
| 5,927,871 A | | 7/1999 | Nakata | 400/61 |

FOREIGN PATENT DOCUMENTS

EP 0 655 706 A1 5/1995 .......... G06K/15/00

* cited by examiner

*Primary Examiner*—Arthur G. Evans
(74) *Attorney, Agent, or Firm*—Fitzpatrick, Cella, Harper & Scinto

(57) ABSTRACT

Image data developed on print buffers can be read at consecutive or adjacent addresses and transferred to recording heads at high speed. An I/F DMA block transfers image data to DRAM at discrete addresses to develop the image data on DRAM. Thereafter, a head DMA block reads the image data in DRAM at addresses consecutive in a mount direction of the recording heads and transfers the read image data to the recording heads.

19 Claims, 21 Drawing Sheets

RECORD CONTROL APPARATUS AND RECORDING APPARATUS

BACKGROUND OF THE INVENTION

1. Field of the Invention

The present invention relates to a record control apparatus for controlling to write record data in a buffer which stores the record data to be recorded with a recording head of a serial scan type.

2. Related Background Art

A recording apparatus such as a printer has a recording head constituted of a plurality of recording elements of a dot impact type, a thermal type or an ink jet type. Record data is generally printed by a serial scan method. Namely, record data is printed while the recording head is moved along a direction perpendicular to the transport direction of a recording sheet. After one row is printed, the recording sheet is transported by an amount corresponding to the width of the recording head. This operation is repeated.

The record data corresponding in amount to the width of a recording head is sequentially supplied to the recording head. The recording elements are driven each time the recording head moves by a distance corresponding to one pixel to thereby form a record image.

[Conventional Data Storage Process 1]

FIG. 19 is a schematic diagram illustrating a record operation by a recording head of a recording apparatus of this type.

As shown in FIG. 19, the recording head can print thirty-two vertical dots at the same time. One row is constituted of 1024 dots in a maximum recordable size of a record sheet.

Conventionally, record data is stored in a storage device such as a DRAM at addresses such as shown in FIG. 20.

FIG. 20 is a memory map of a storage medium for storing record data to be recorded with a recording apparatus of this type. Record data provided through a drive such as an interface is often transferred in the order of a scanning direction of the recording head, so that it is stored in the storage medium at horizontally consecutive addresses.

In this example shown in FIG. 20, bandlike data of 8 vertical bits for the first row is stored at addresses from "0000H" to "03FFH" by the amount corresponding to horizontal 1024 bits. Bandlike data of 8 vertical bits for the next row is stored at addresses from "0400H" to "07FFH" by the amount corresponding to 1024 horizontal bits.

Such bandlike data is sequentially stored in a print buffer memory having a capacity of 5120 bytes at addresses from "0000H" to "13FFH". Therefore, after bandlike data of five rows is stored, the next data cannot be stored in the buffer memory.

The vertical width of the recording head is 32 dots and can record bandlike data of four rows at the same time. Therefore, bandlike data is sequentially read starting from the start addresses "0000H", "0400H", "0800H" and "0C00H", and each time the recording head moves by an amount corresponding to one pixel, bandlike data is read at the addresses incremented by "1". In this manner, four memory bands are controlled to read bandlike data.

More specifically, bandlike data is read from addresses "0000H", "0400H", "0800H" and "0C00H", and after the recording head moves by one pixel amount, bandlike data is read from addresses "000H", "0401H", "0801H" and "0C01H". This data read process is performed up to the addresses "03FFH", "07FFH", "0BFFH" and "0FFFH" to complete data read of one scan.

After the recording head is scanned once, the buffer memory becomes empty by the amount corresponding to four bands and the next data can be supplied from the interface and stored starting from the address "0000H".

After the data of the four bands is stored in the buffer memory, the recording head records bandlike data starting from the start addresses "1000H", "0000H", "0400H" and "0800H", and each time the recording head moves by an amount corresponding to one pixel, bandlike data is read at the addresses incremented by "1".

[Conventional Data Storage Process 2]

In the memory address storing method according to the above-described conventional data storage process 1, sequentially read memory addresses are not continuous so that memory access in a fast page mode of DRAM is not possible. If a scan speed is relatively slow, a memory access in the fast page mode is not necessary. However, it is essential for a fast speed and high density record system to use the fast page mode memory access.

It is therefore necessary to store bandlike data at addresses sequentially incrementing by "1" in the order of data read. Conventionally, as shown in FIG. 21, bandlike data is stored by rearranging the addresses in the order of data read.

FIG. 21 is a memory map of another storage medium for storing record data to be recorded with a recording apparatus of this type. In order to improve the print quality, the same data is divided and stored for a plurality of passes. At the first pass, record data is read from addresses "0000H", "0001H", "0002H" and "0003H" and each time the recording head moves by a distance corresponding to one pixel, record data is read at addresses sequentially incremented by "1" as "0004H", "0005H", "0006H" and "0007H". However, at the second pass, record date is read at addresses not continuous as "0001H", "0002H", "0003H" and "1000H". Therefore, the fast page mode data transfer is frequently interrupted.

Similar to the conventional data storage process 1, an address generation block for managing a plurality of memory bands is necessary, which results in a large circuit scale.

SUMMARY OF THE INVENTION

The present invention has been made in order to solve the above problems. It is an object of the present invention to provide a record control apparatus capable of changing the storage addresses of image data contained in input record information to consecutive addresses from which the image data can be read consecutively to develop the image data on print buffers and capable of reading the developed image data at the consecutive or adjacent addresses to transfer them to the recording heads and print them at high speed.

According to one aspect of the present invention, a record control apparatus for controlling to write record data into a plurality of print buffers (DRAM 106), the record data being recorded with recording heads (103) reciprocally moving on a recording medium, is provided which comprises: reception means for receiving input record information; developing means (I/F DMA block) for transferring image data of consecutive vertical m dots×horizontal n dots contained in the record information received by the reception means to the print buffers at discrete addresses to develop the image data on the print buffers; and data transfer means (head DMA block 108) for reading the image data in the print buffers at addresses consecutive in an array direction of the recording heads and transferring the read image data to the recording heads.

According to another aspect of the invention, a record control apparatus for controlling to write record data into a plurality of print buffers (DRAM 106), the record data being recorded with recording heads (103) reciprocally moving on a recording medium, is provided which comprises: reception means for (I/F block 104) for receiving input record information; developing means (I/F DMA block 105) for transferring image data of consecutive vertical m dots×horizontal n dots contained in the record information received by the reception means to the print buffers at discrete addresses to develop the image data on the print buffers; data conversion means (HV conversion DMA block 802) for reading the image data of a predetermined number of blocks developed on the print buffers by the developing means, and developing again the image data on the print buffers by reversing the arrangement of horizontal and vertical direction elements; and data transfer means (head DMA block 108) for reading the image data in the print buffers developed again by the data conversion means at addresses consecutive in an array direction of the recording heads and transferring the read image data to the recording heads.

According to another aspect of the present invention, a recording apparatus is provided which uses one of the record control apparatuses described above.

BRIEF DESCRIPTION OF THE DRAWINGS

FIG. 13 is a diagram illustrating the record data structure of a DRAM shown in FIG. 12.

FIG. 17 is a diagram showing a record data map of a record control apparatus according to the third embodiment of the invention.

DETAILED DESCRIPTION OF THE PREFERRED EMBODIMENTS

Embodiments of the invention will be described with reference to the accompanying drawings.

Figure 1:
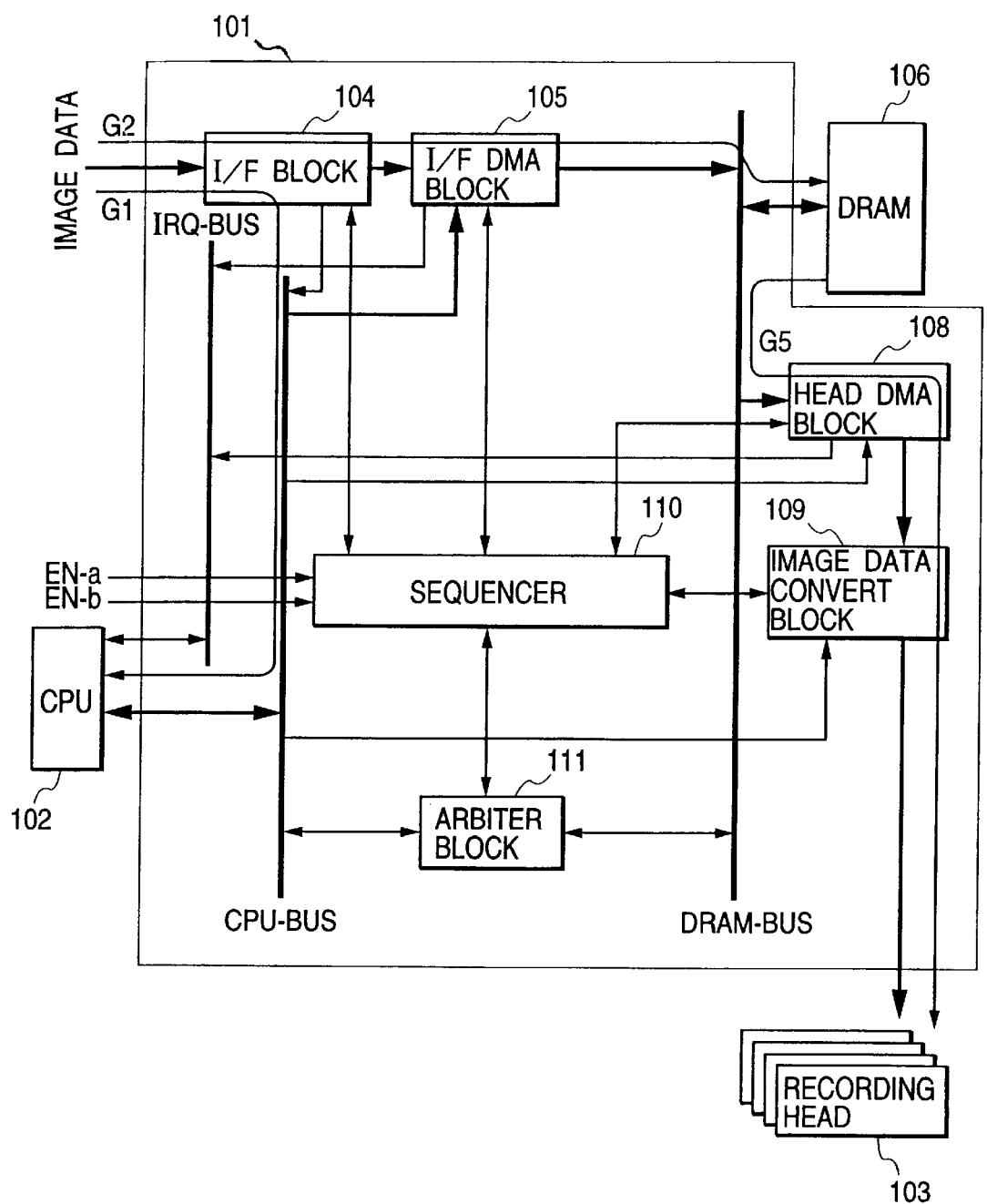
FIG. 1 is a block diagram showing the main structure of a record control apparatus according to a first embodiment of the invention.

FIG. 1 is a block diagram showing the main structure of a record control apparatus according to the first embodiment of the invention. The record control apparatus corresponds to a control circuit for controlling a print buffer which stores print data.

In FIG. 1, reference numeral 101 represents a print buffer control circuit. Reference numeral 104 represents an interface block (I/F block) constituted of a FIFO memory. The interface block 104 receives data including image data and temporarily stores it. A microprocessor (CPU) 102 analyzes (refer to a data path G1) control codes contained in the temporarily stored data and transfers (refer to a data path G2) only the image data to a print buffer assigned to a DRAM 106 by controlling an interface DMA block 105.

Data in DRAM 106 so arranged as to conform with the array order of recording heads 103 of four colors is transferred (refer to data path G5) to the heads 103 by activating a head DMA block 108, and is ready to be printed out. An image data conversion block 109 performs a thinning process for data which is printed with a plurality of passes, and other processes.

The operation of each block is controlled by a sequencer 110. The sequencer 110 is supplied with encoder signals EN-a and EN-b representative of drive positions of the recording heads 103.

Data in DRAM 106 is transferred via a data path G2. The data transfer is arbitrated by an arbiter block 111.

The capacity of a print buffer per recording head is 5120 bytes. Buffer addresses from "OOOOH" to "13FFH" are assigned to a first recording head, buffer addresses from "1400H" to "27FFH" are assigned to a second recording head, buffer addresses from "2300H" to "3BFFH" are assigned to a third recording head, and buffer addresses from "3COOH" to "4FFFH" are assigned to a fourth recording head.

Figure 2:
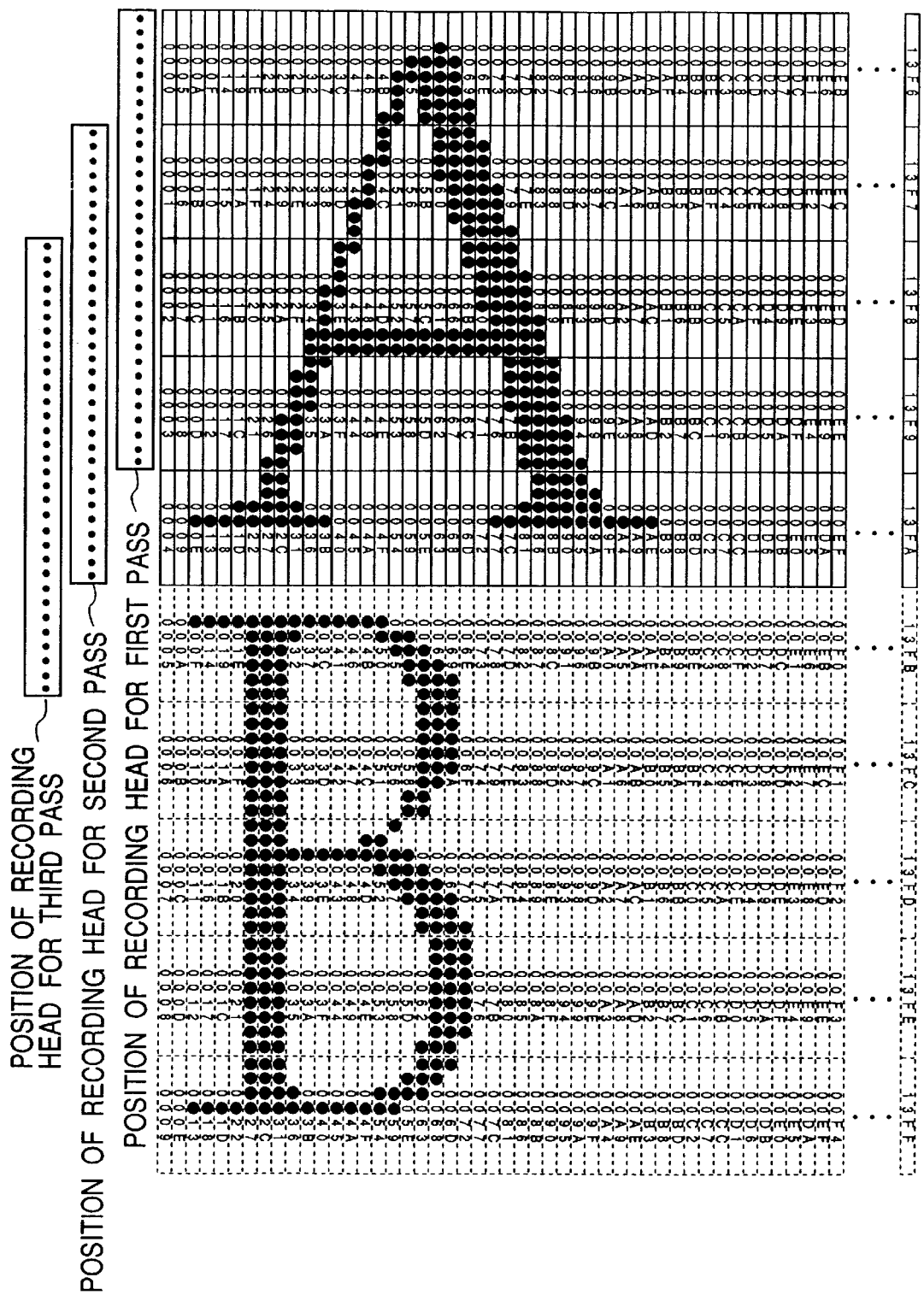
FIG. 2 is a diagram showing the record data structure of a DRAM shown in FIG. 1.

FIG. 2 is a diagram showing the structure of print data in DRAM shown in FIG. 1.

In the example shown in FIG. 2, assuming that the capacity of the print buffer per one recording head is 5120 bytes from "0000H" to "13FFH" and that the number of lines (or columns) in the horizontal direction per one scan is 1024, a buffer area capable of storing data of vertical 40 dots can be maintained. Data from the interface is sequentially written at addresses "0000H", "0005H", "000AH", . . . After data is written in the full horizontal width, next data is sequentially written at addresses "0001H", "0006H", "000BH", . . . In this manner, data up to the address "13FFH" is written.

In reading print data, first data of 32 dots is sequentially read at addresses "OOOOH", "0001H", "0002H" and "0003H". After the recording head moves by a distance corresponding to one pixel, the next data of the next 32 is sequentially read at addresses "0005H", "0006H", "0007H" and "0008H".

Assuming that four-pass printing is performed, after one scan of the recording head, data of 8 vertical dots and 1024 horizontal dots in the highest row stored at every sixth addresses from "OOOOH" to "13F6H" is completely printed. The next data from the interface can therefore be stored in the addresses. In this case, the next data is stored in the address order of "0005H", "OOOAH", "OOOFH", . . . .

For the next line print, data is read at addresses "0001H", "0002H", "0003H" and "0004H", and for the second next line print, data is read at addresses "0002H", "0003H", "0004H" and "0005H". In this manner, data to be transferred to the recording head is always read at addresses sequentially incremented by "1". Therefore, the possibility of fast page mode access of DRAM becomes very high frequently and data can be transferred always and stably at high speed.

Next, the operation of each block shown in FIG. 1 will be described with reference to FIGS. 3 to 8.

Figure 3:
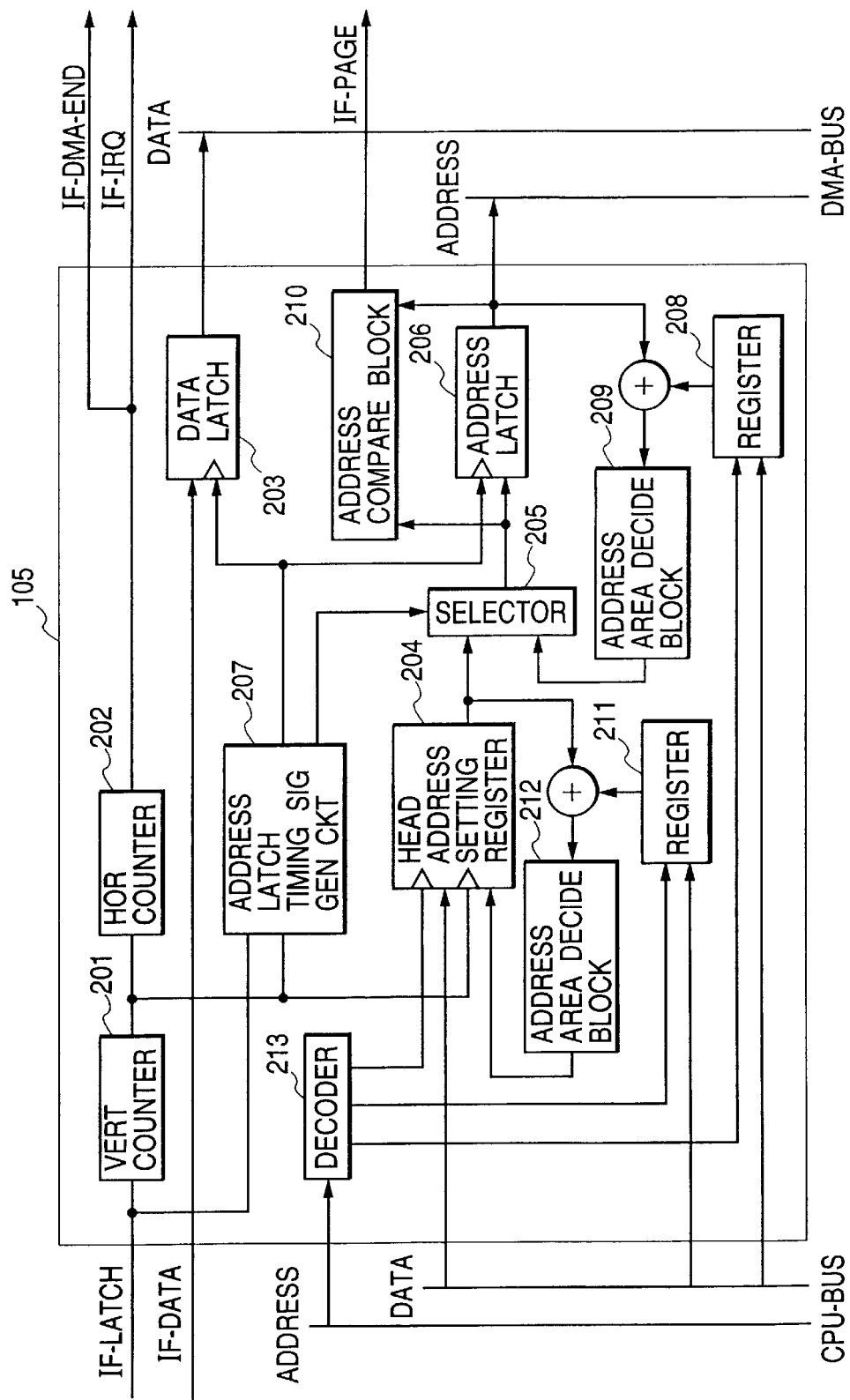
FIG. 3 is a block diagram showing the details of an interface DMA block shown in FIG. 1.

FIG. 3 is a block diagram showing the details of the interface DMA block 105 shown in FIG. 1.

In FIG. 3, a vertical counter 201 counts for each one byte of data, being set to the number of transfers necessary for sequentially transferring image data corresponding in the number of column dots. A horizontal counter 202 counts for each one byte data, being set to the number of transfers necessary for sequentially transferring image data corresponding to the number of row dots.

A data latch 203 temporarily latches image data supplied from the interface block 102. A head (start) address setting register 204 designates the start address of DRAM 106 in order to store transferred data in DRAM 106 at predetermined locations.

An address selector 205 selects either an address set in the start address setting register 204 or an output of an address area decision block 209 and outputs the selected one, in accordance with an output of an address latch timing signal generator circuit 207. An address latch 206 temporarily stores an address of presently transferred image data to be stored in DRAM 106. The address area decision block 209 operates so that the address of the currently stored data added by a first address addition value set to a register 208 does not exceed a predetermined storage range. The details of the address area decision block 209 will be later given with reference to FIG. 4.

The address latch timing signal generator circuit 207 generates a switching signal for the selector 205, an address signal and a data latch signal in accordance with a data latch signal IF-LATCH supplied from the interface block 104 and a count-up signal supplied from the vertical counter 201.

The register 208 stores the first address addition value set by CPU 102, this value indicating a discrete value of a storage address when vertically consecutive data is stored. An address comparison block 210 checks the upper bits of addresses to compare the presently latched address with the added next address and judges whether the both addresses are in the same page area of DRAM 106, the judgment result being supplied to the sequencer 110. If the addresses are in the same page area, image data is read from DRAM 106 in the fast page mode.

A register 211 stores a second address addition value by CPU 102, this value indicating a discrete value of a storage address when horizontally consecutive data is stored. An address area decision block 212 operates so that the address of the currently store data added by the second address addition value set to the register 211 does not exceed of a predetermined storage area. A decoder 213 generates signals necessary when CPU 102 writes data in each register.

Figure 4:
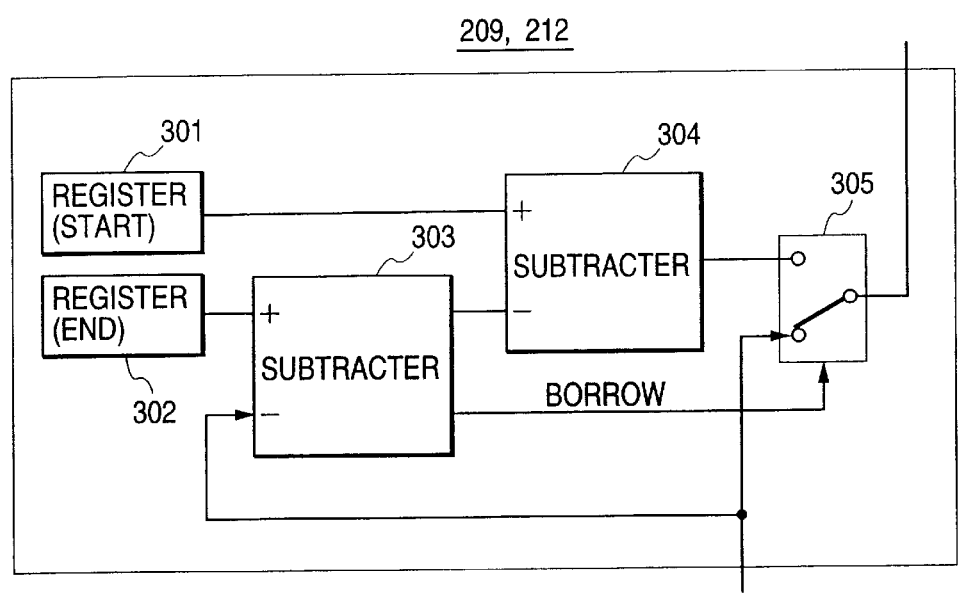
FIG. 4 is a block diagram showing the details of an address area decision block shown in FIG. 3.

FIG. 4 is a block diagram showing the structure of the address area decision blocks 209 and 212 shown in FIG. 3.

In FIG. 4, a register 301 stores the start address of the print buffer, the contents thereof being rewritten by CPU 102. A register 302 stores the end address of the print buffer, the contents thereof being rewritten by CPU 102. A subtractor 303 subtracts the next address obtained by adding the present address to the addition value, from the value in the end address register 302. If this subtraction value becomes positive (if the next address does not exceed the end address), the subtractor 303 does not generate a borrow signal so that a selector 305 selects the next address.

If the next address obtained by adding the present address to the addition value is subtracted from the value in the end address register 302 and this subtraction value becomes negative (if the next address exceeds the end address), a subtractor 304 outputs a value obtained by subtracting the negative value from the value in the start address register 301 (i.e., the start address added to the excessive value). In this case, since the borrow signal is output, the selector 305 selects this output from the subtractor 304 as the next address.

At the count-up of the horizontal counter 202 unshown in FIG. 3, it outputs a signal IF-IRQ and a signal IF-DMA-END indicating that the necessary number of DMA transfers has been executed, so that the sequencer 110 and CPU 102 are informed of the transfer completion. In a case where bandlike image data of vertical 32 bits and horizontal 1024 bits sequentially transferred from the interface, that data is re-arranged and stored in DRAM 106 at addresses shown in FIG. 2. In this case, "OOOOH" is set to the start address setting register 204 as the initial value of the transfer address, "1" is set to the register 208 which stores the first address addition value (addition value in the vertical direction), "5" is set to the register 211 which stores the second addition value (addition value in the horizontal direction), "4" is set to the vertical counter 201 (it is necessary to transfer data of vertical 32 bits from the interface of 8-bit width four times), and "1024" is set to the horizontal counter 202. In this manner, a DRAM address is renewed each time the interface receives one byte to write data in DRAM 106.

Since an interrupt is generated after data is transferred 1024 times, CPU 102 starts analyzing the next data supplied from the interface. In order to sequentially transfer the next data, "0005H" is set to the start address setting register 204 with the other registers being set with the same values, to resume DMA transfers. The above operations are sequentially repeated to store record data such as shown in FIG. 2 in DRAM 106.

Figure 5:
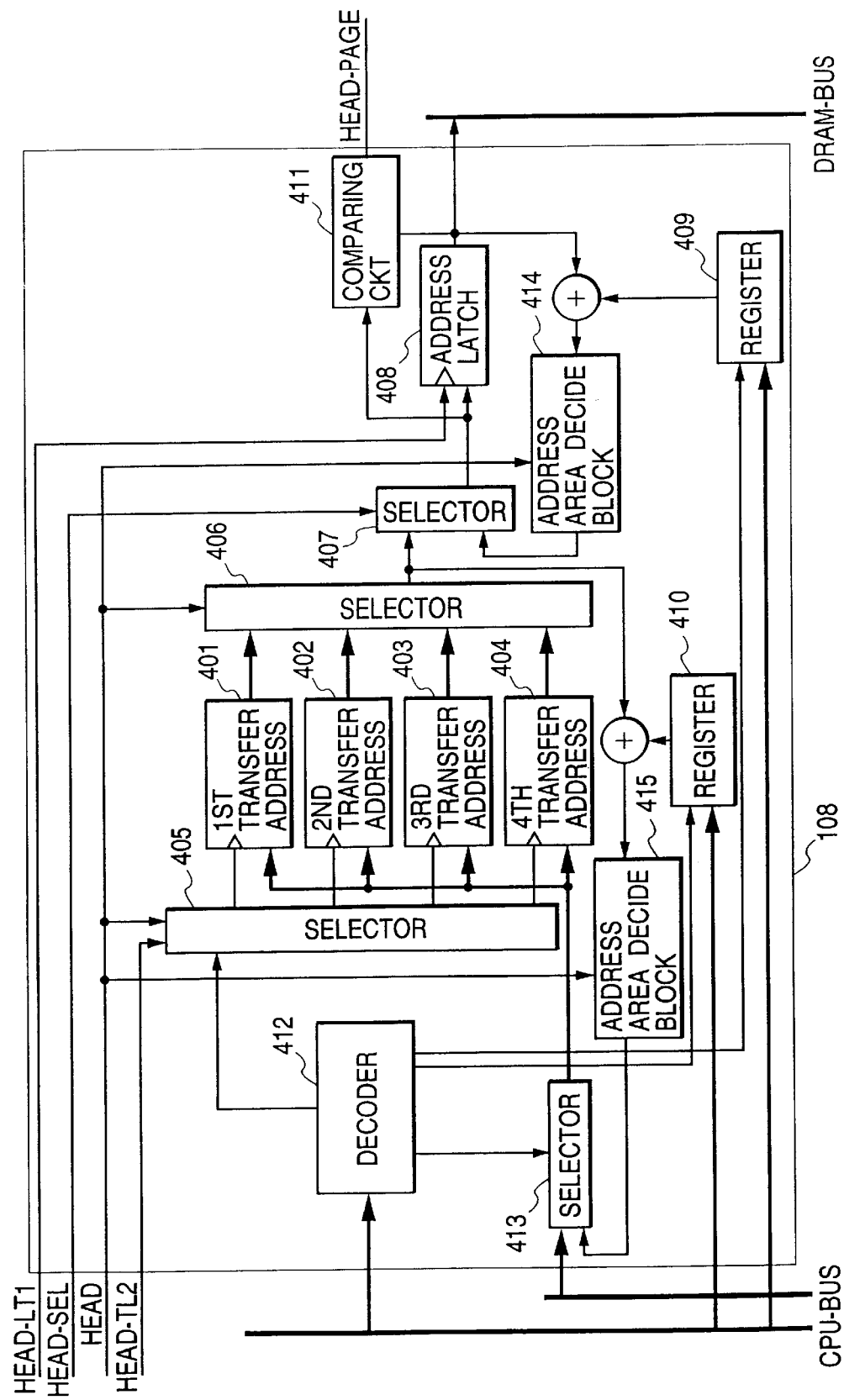
FIG. 5 is a block diagram showing the details of a head DMA block shown in FIG. 1.

FIG. 5 is a block diagram showing the details of the head DMA block 108 shown in FIG. 1.

In FIG. 5, the head DMA block 108 includes first to fourth transfer address designating blocks 401, 402, 403 and 404, a write selector 405, a read selector 406, an address latch 408 and the like. Each transfer address designating block has a start address of an area where image data is stored for each of the first to fourth recording heads. The write and read selectors 405 and 406 are switched in response to a transfer timing (HEAD signal line) of each recording head. The address latch 408 stores the present transfer address.

A selector 407 selects as the next address either a value obtained by adding the address addition value "1" in a register 409 to the present transfer address latched in an address latch 408 or a start address of each raster selected by the selector 406.

A register 410 stores the second address addition value set to the register 211 and has a function of setting an interval between start addresses for respective rasters for each of the recording heads. After the start address of one raster of each head is transferred to the address latch 408, the value added with the second address addition value is written as the start address of the next raster in a transfer address of the presently selected head.

An address comparing circuit 411 operates to judge whether the present transfer address and next transfer address are in the same page of DRAM 106. It is judged from an output signal of the comparing circuit 411 whether the fast page mode access of DRAM 106 is possible. The arbiter 111 switches between the fast page mode access and a normal memory access.

A decoder 412 analyzes data on a bus CPU-BUS and generates a data write signal for each register. Under the control of the decoder 412, a selector 413 switches between data write lines of the first to fourth transfer address designating blocks.

An address area decision block 414 is a block for judging whether the next address obtained by adding the first address addition value set in the register 409 to the present transfer address latched in the address latch 408 is within a printer buffer area assigned to each recording head.

An address area decision block 415 is a block for judging whether the value obtained by adding the start address of each raster of each head in each of the first to fourth transfer address designating blocks to the second address addition value stored in the register 410 is within a printer buffer area assigned to each recording head.

Figure 6:
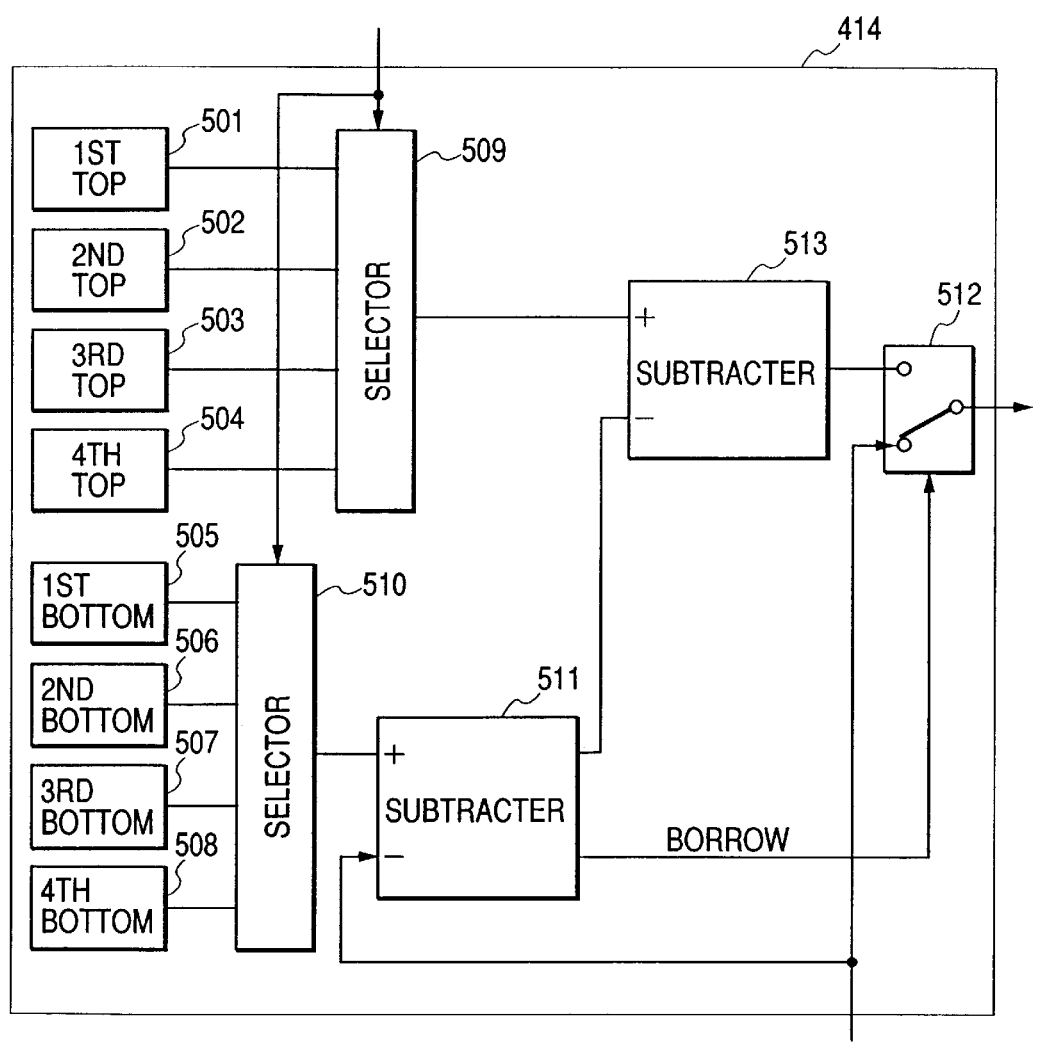
FIG. 6 is a block diagram showing the details of an address area decision block in a DMA block shown in FIG. 5.

FIG. 6 is a block diagram showing the details of the address area decision blocks 414 and 415 in the head DMA block 108 shown in FIG. 5.

In FIG. 6, a register 501 stores the start (top) address of a print buffer assigned to the first recording head, the contents thereof being rewritten by CPU 102. A register 502 stores the start address of a print buffer assigned to the second recording head, the contents thereof being rewritten by CPU 102. A register 503 stores the start address of a print buffer assigned to the third recording head, the contents thereof being rewritten by CPU 102. A register 504 stores the start address of a print buffer assigned to the fourth recording head, the contents thereof being rewritten by CPU 102.

A register 505 stores the end (bottom) address of a print buffer assigned to the first recording head, the contents thereof being rewritten by CPU 102. A register 506 stores the end address of a print buffer assigned to the second recording head, the contents thereof being rewritten by CPU 102. A register 507 stores the end address of a print buffer assigned to the third recording head, the contents thereof being rewritten by CPU 102. A register 508 stores the end address of a print buffer assigned to the fourth recording head, the contents thereof being rewritten by CPU 102.

A selector 509 selects one of the start addresses in the registers 501 to 504 functioning as a print buffer, in accordance with the present color signal HEAD. A selector 510 selects one of the end addresses in the registers 505 to 508 functioning as a print buffer, in accordance with the present color signal HEAD.

A subtractor 511 subtracts the next address obtained by adding the present address to the addition value, from the end address selected by the selector 510. If this subtraction value becomes positive (if the next address does not exceed the end address), the subtractor 511 does not generate a borrow signal so that a selector 512 selects the next address obtained by adding the present address to the address addition value.

If the next address obtained by adding the present address to the addition value is subtracted from the end value selected by the selector 510 and this subtraction value becomes negative (if the next address exceeds the end address), a subtractor 513 outputs a value obtained by subtracting the negative value supplied from the subtractor 511 from the start address selected by the selector 509 (i.e., the start address added to the excessive value). In this case, since the borrow signal is output, the selector 512 selects this output from the subtractor 304 as the next address.

The structure and operation of the image data conversion circuit 109 will be described with reference to FIG. 7.

Figure 7:
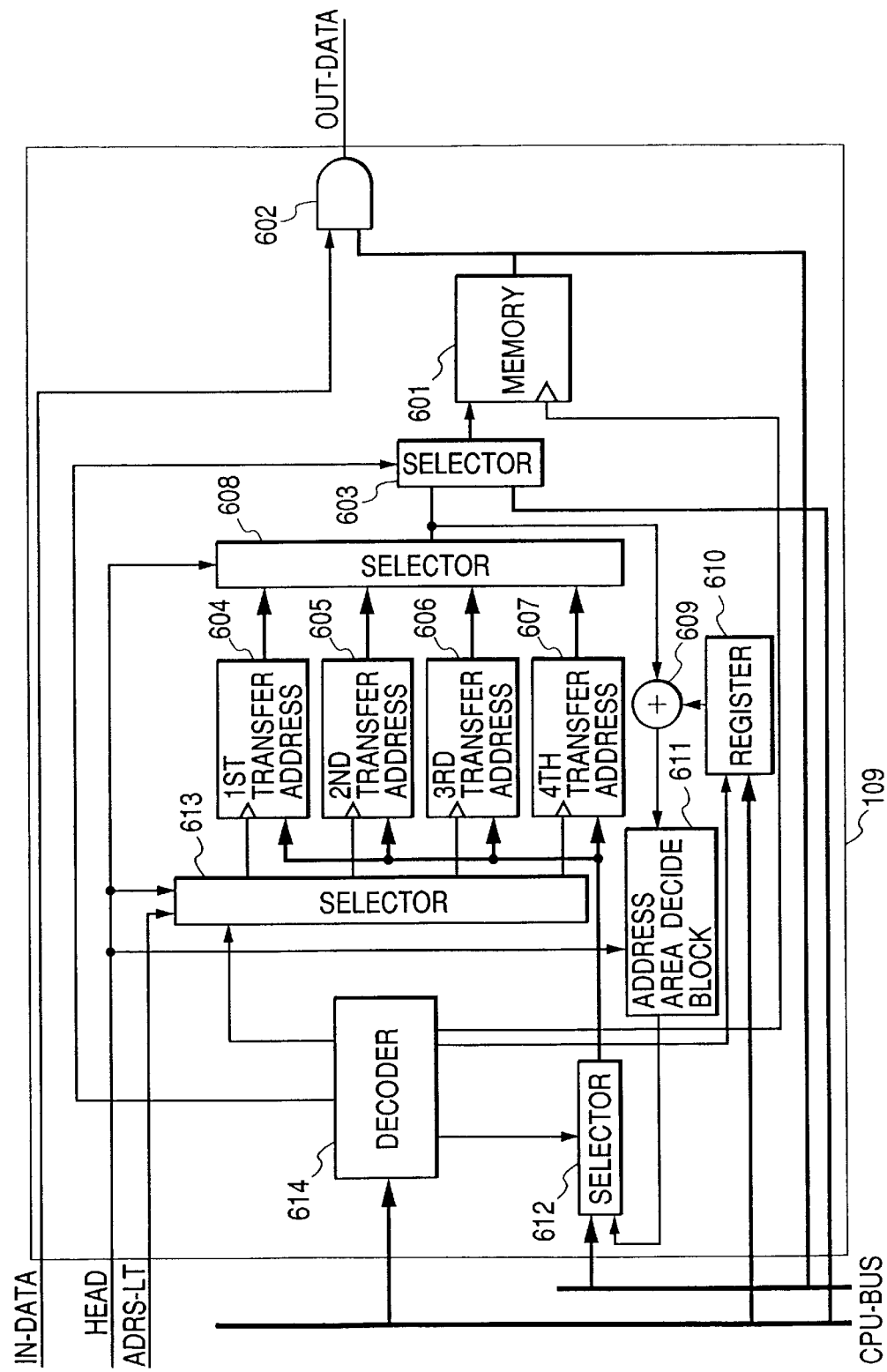
FIG. 7 is a block diagram showing the details of the structure of an Image data conversion circuit shown in FIG. 1.

FIG. 7 is a detailed block diagram showing the structure of the image data conversion block 109 shown in FIG. 1. If record data is printed by using a plurality of passes, for example, two passes, each recording head passes through the same position two times. Therefore, if the record data is not thinned, a twofold density record is performed. It is therefore necessary to mask the record data 50% at the image data conversion block 109.

In FIG. 7, a memory (mask data storage memory) 601 stores mask data. Record data of 4 bytes per each head is input via a signal line IN-DATA, and an AND gate 602 takes an AND of an output of the mask data (mask pattern) storage memory 601 and record data. The AND data is output to a data line OUT-DATA. The mask data can be rewritten by CPU 102. A selector 603 connects the address bus of CPU 102 to an address bus of the memory 601 when the mask data is rewritten by CPU 102.

Each time one byte data is transferred to the recording head, the mask data is changed. To this end, first to fourth start address (first to fourth transfer address) registers 604 to 607 are provided which store the read addresses for respective recording heads. Each of the first to fourth start address registers 604 to 607 is selected by a selector 608.

In order to update the read address registers 604 to 607 each time one byte data is transferred, an adder 609 adds an output of the read selector 608 to an address addition value in a register 610, and supplies the addition result to an address area decision block 611.

An address output from the address area decision block 611 is supplied, via a selector 612 which connects a data line to the first to fourth start address registers 604 to 607, to the register which is selected by a selector 613 in accordance with a signal from the head select signal line HEAD, when a latch timing signal ADRS-LT is supplied.

Initial addresses in the first to fourth start address registers 604 to 607 can be rewritten by CPU 102 by connecting the data bus of CPU 102 to the register which is designated by a decoder 614. In this manner, the address in the mask data storage memory 601 is sequentially updated.

Figure 8:
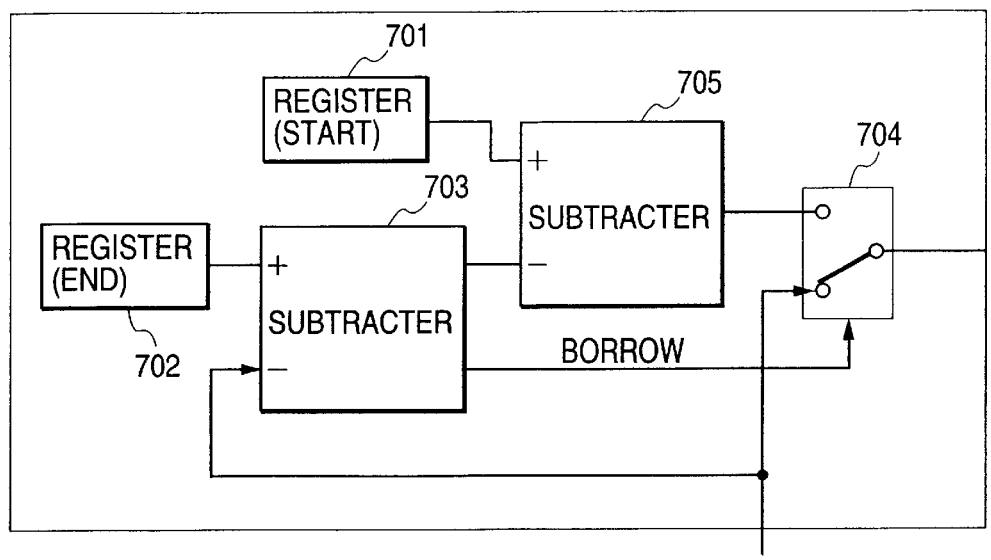
FIG. 8 is a block diagram showing the details of the structure of an address order dicision block shown in FIG. 7.

FIG. 8 is a block diagram showing the detailed structure of the address area decision block 611 of the image data conversion block 109 shown in FIG. 7.

In FIG. 8, a register 701 stores the start address of the print buffer, the contents thereof being rewritten by CPU 102. A register 702 stores the end address of the print buffer, the contents thereof being rewritten by CPU 102. A subtractor 703 subtracts the next address obtained by adding the present address to the addition value, from the value in the end address register 702. If this subtraction value becomes positive (if the next address does not exceed the end address), the subtractor 703 does not generate a borrow signal so that a selector 704 selects the next address. If the next address obtained by adding the present address to the addition value is subtracted from the value in the end address register 702 and this subtraction value becomes negative (if the next address exceeds the end address), a subtractor 705 outputs a value obtained by subtracting the negative value from the value in the start address register 701 (i.e., the start address added to the excessive value). In this case, since the borrow signal is output, the selector 704 selects this output from the subtractor 705 as the next address.

Figure 9:
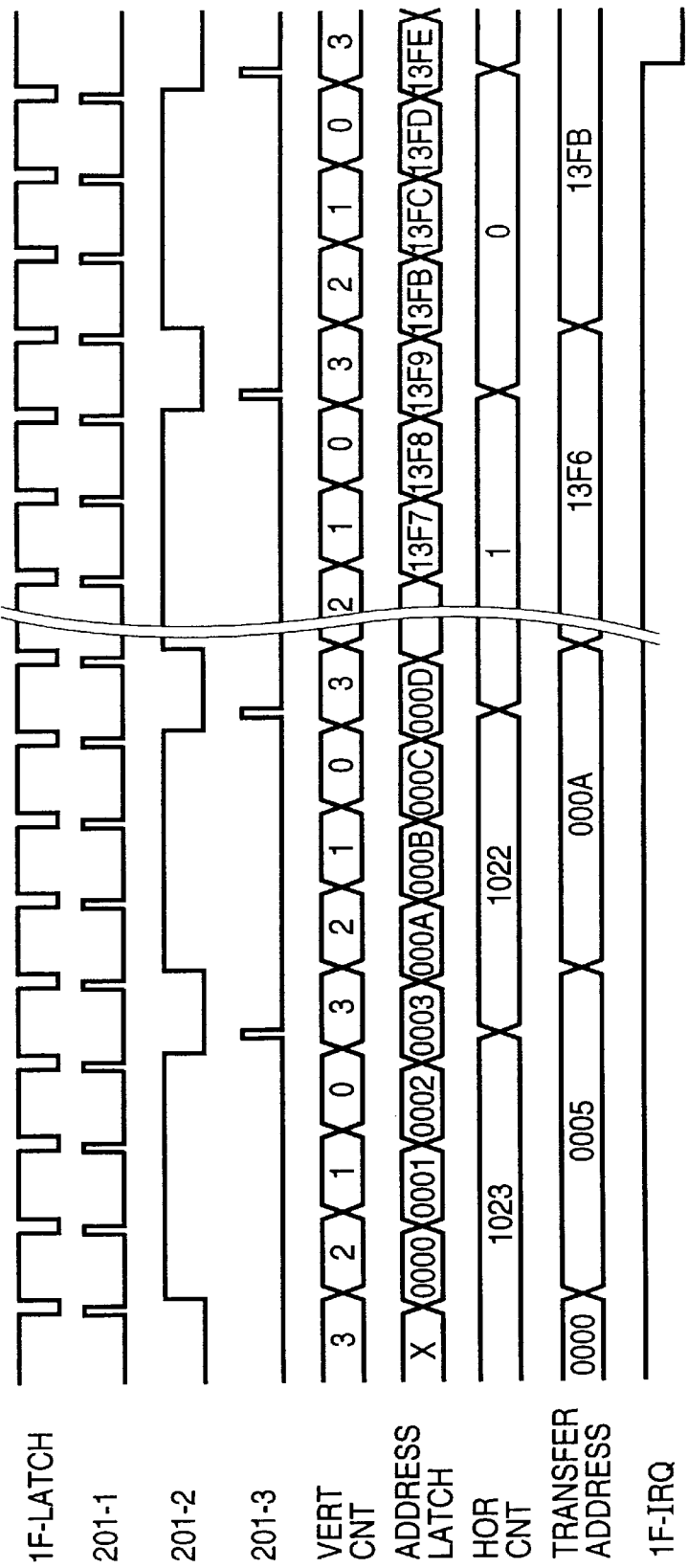
FIG. 9 is a timing chart illustrating the operation of the interface DMA shown in FIG. 1.
Figure 10:
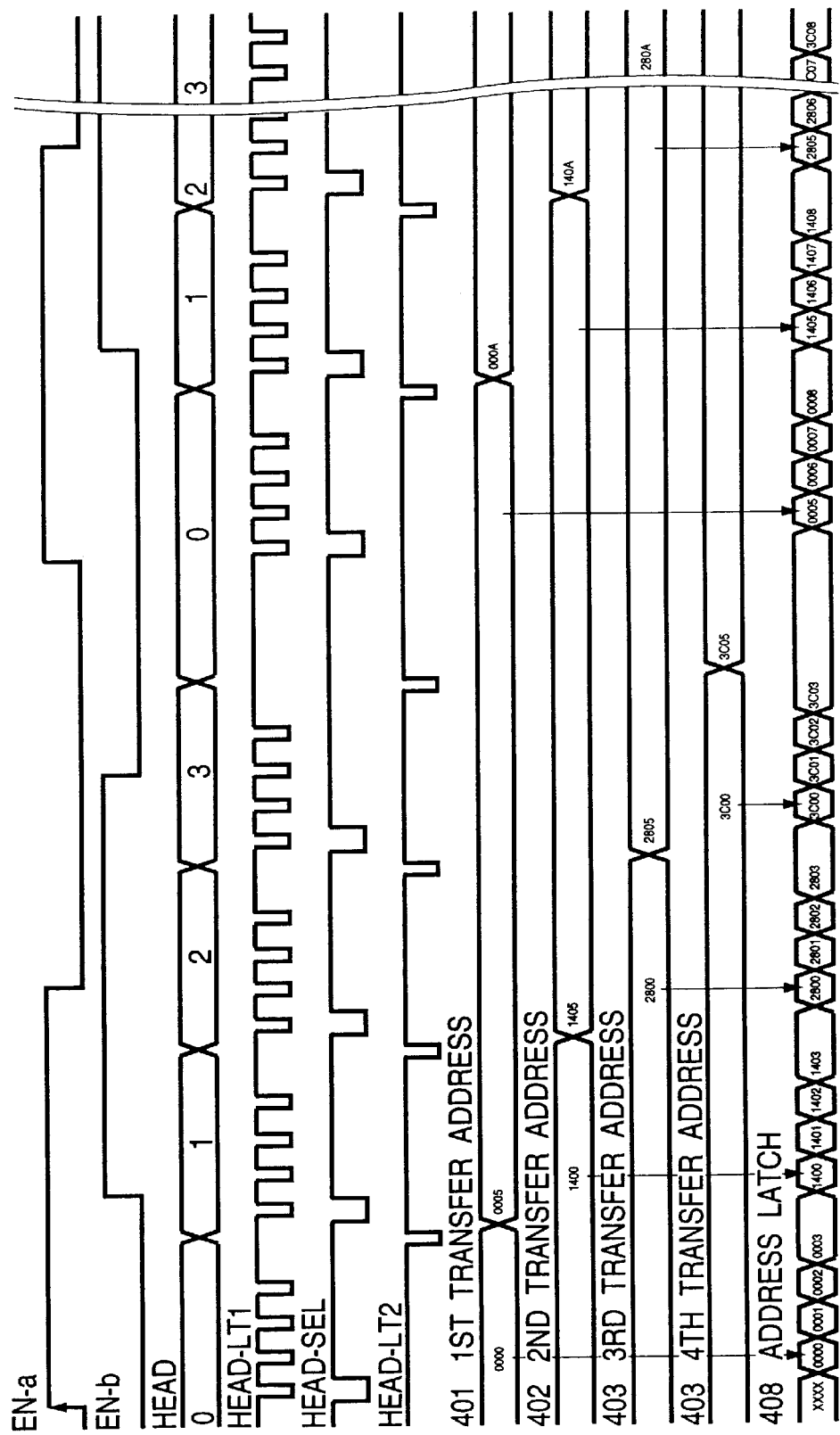
FIG. 10 is a timing chart illustrating the operation of the head DMA block shown in FIG. 1.
Figure 11:
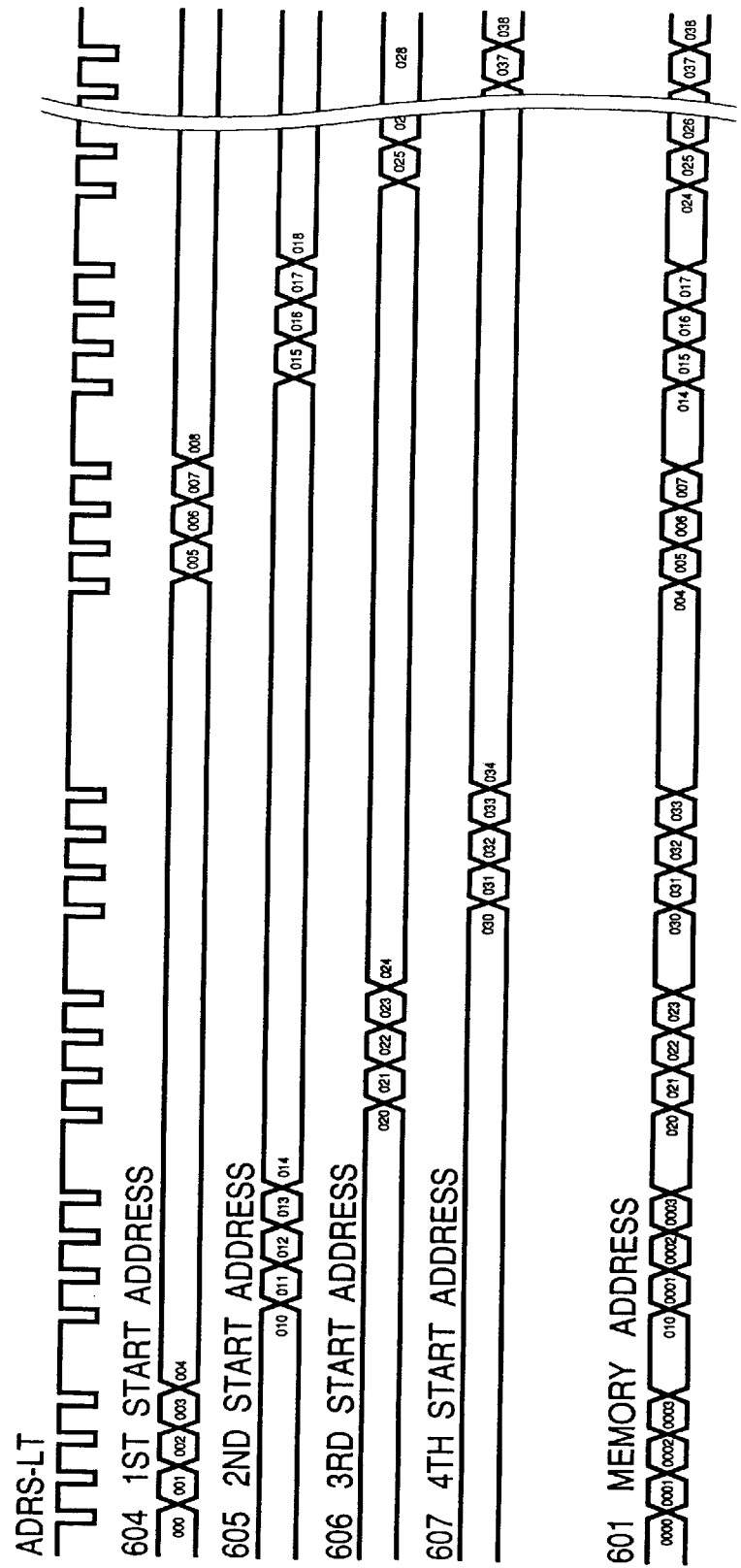
FIG. 11 is a timing chart illustrating the operation of the image data conversion block shown in FIG. 1.

FIGS. 9 to 11 are timing charts illustrating the operation of each block and signal lines of the sequencer shown in FIG. 1. Like elements to those shown in FIGS. 1 to 5 are represented by using identical reference numerals and names.

FIG. 9 is a timing chart illustrating the operation of the interface DMA block 105 shown in FIG. 1. Like elements to those shown in FIG. 3 are represented by using identical reference numerals and names.

As shown in FIG. 9, in response to the IF-LATCH pulse which is generated each time one byte data is received the present contents "0000H" of the start address setting register 204 are latched via the selector 205 by the address latch 206. At the same time, the contents of the vertical counter 201 are decremented by "1" and changed to "2". When the next one byte data is received, the contents "0000H" of the address latch 206 storing the present address are added to the address addition value "1" set to the register 208, and the addition value "0001H" is latched via the selector 205 by the latch 206 and the vertical counter 201 is changed to "1".

After the four-byte data is transferred, the vertical counter 201 changes from "0" to "3", the horizontal counter 202 is decremented by "1" and changed to "1022", and the value "000AH" obtained by adding the initial value "0000H" to the second address addition value "0005H" set to the register 211 is written in the start address setting register 204.

The count-down of the vertical and horizontal counters 201 and 202 progresses in the manner described above. After data sufficient for changing "0" to the initial set value is received, the state on the signal line IF-IRQ changes to notify CPU 102 of a reception completion of data of vertical 32 dots and horizontal 1024 dots.

FIG. 10 is a timing chart illustrating the operation of the head DMA block 108 (FIG. 5) shown in FIG. 1. Like elements to those shown in FIG. 6 are represented by using identical reference numerals and names.

As shown in FIG. 10, if a value of the signal line HEAD is "0" (zero), and the signal line HEAD-SEL takes a "low" state at the first pulse timing of the signal HEAD-LT1 which shows a transfer timing of four bytes, the value (e.g., "0000H") set to the first transfer address block 401 is latched by the address latch 408. At the timings of following three pulses, the signal line HEAD-SEL takes a "high" state, so that the addresses incrementing by the first address addition value, e.g., "1" in the register 409 are sequentially latched by the address latch 408.

Thereafter, as one pulse of the signal HEAD-LT2 is generated, the contents of the first transfer address block are added to the second address addition value, e.g., "5" and at the same time the signal HEAD changes to "1" to start a data transfer to the second recording head.

FIG. 11 is a timing chart illustrating the operation of the image data conversion block 109 shown in FIG. 1. Like elements to those shown in FIG. 7 are represented by using identical reference numerals and names.

In the image data conversion block 109, there is applied, the signal HEAD for selecting the first to fourth Recording heads as in the head DMA block 108 (FIG. 5). As shown in FIG. 11, there are applied from the signal line ADR-LT four pulses per one recording head in order to generate the address signal for the mask memory 601 storing masking data for image data. In this manner, the addition value set to the register 409 for one pulse, is added to each of the registers 604 to 607, thus the values of the registers are updated.

[Second Embodiment]

Figure 12:
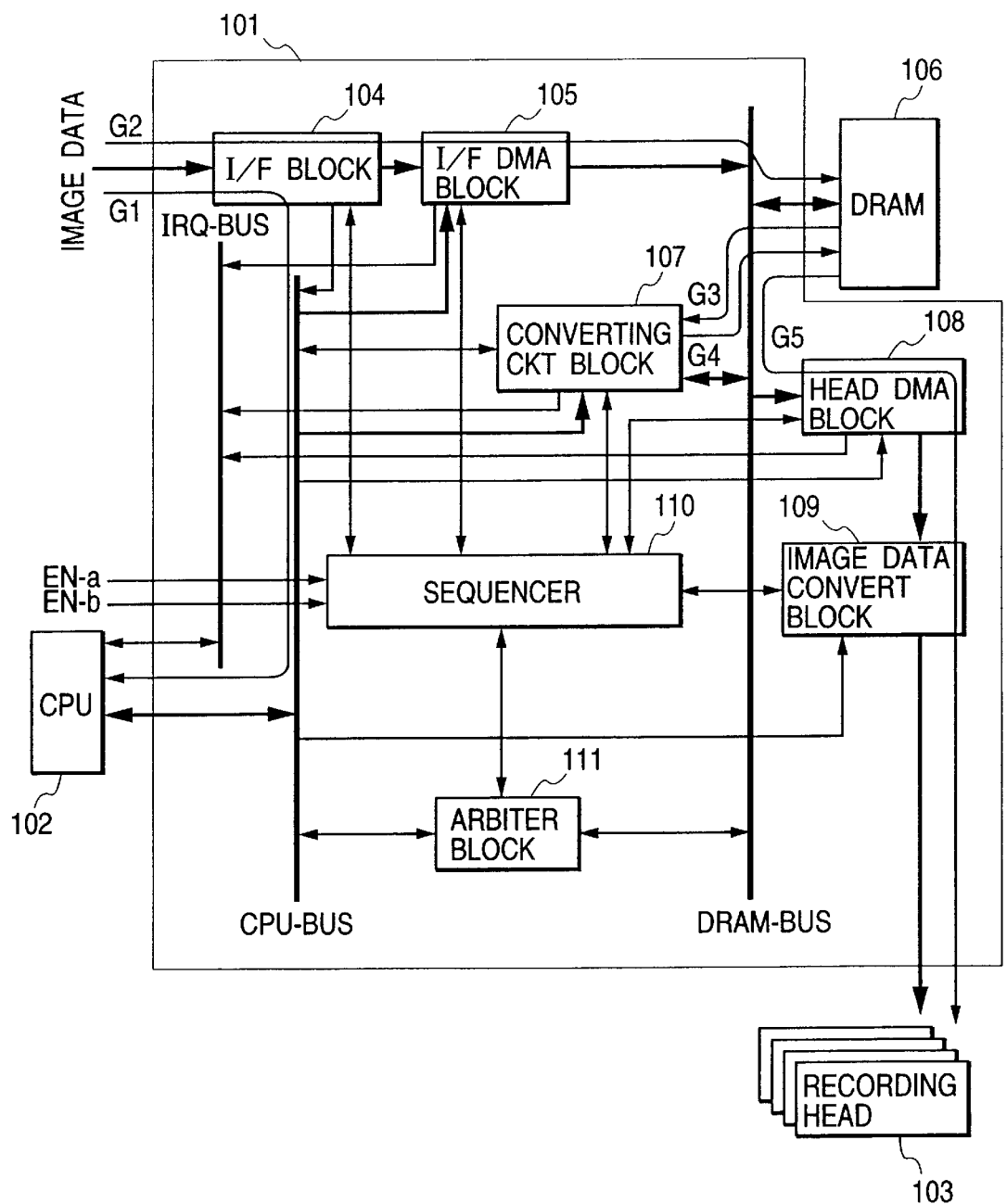
FIG. 12 is a block diagram showing the main structure of a record control apparatus according to a second embodiment of the invention.

FIG. 12 is a block diagram showing the main structure of a record control apparatus according to the second embodiment of the invention. Like elements to those shown in FIG. 1 are represented by identical reference numerals and names.

Figure 13:
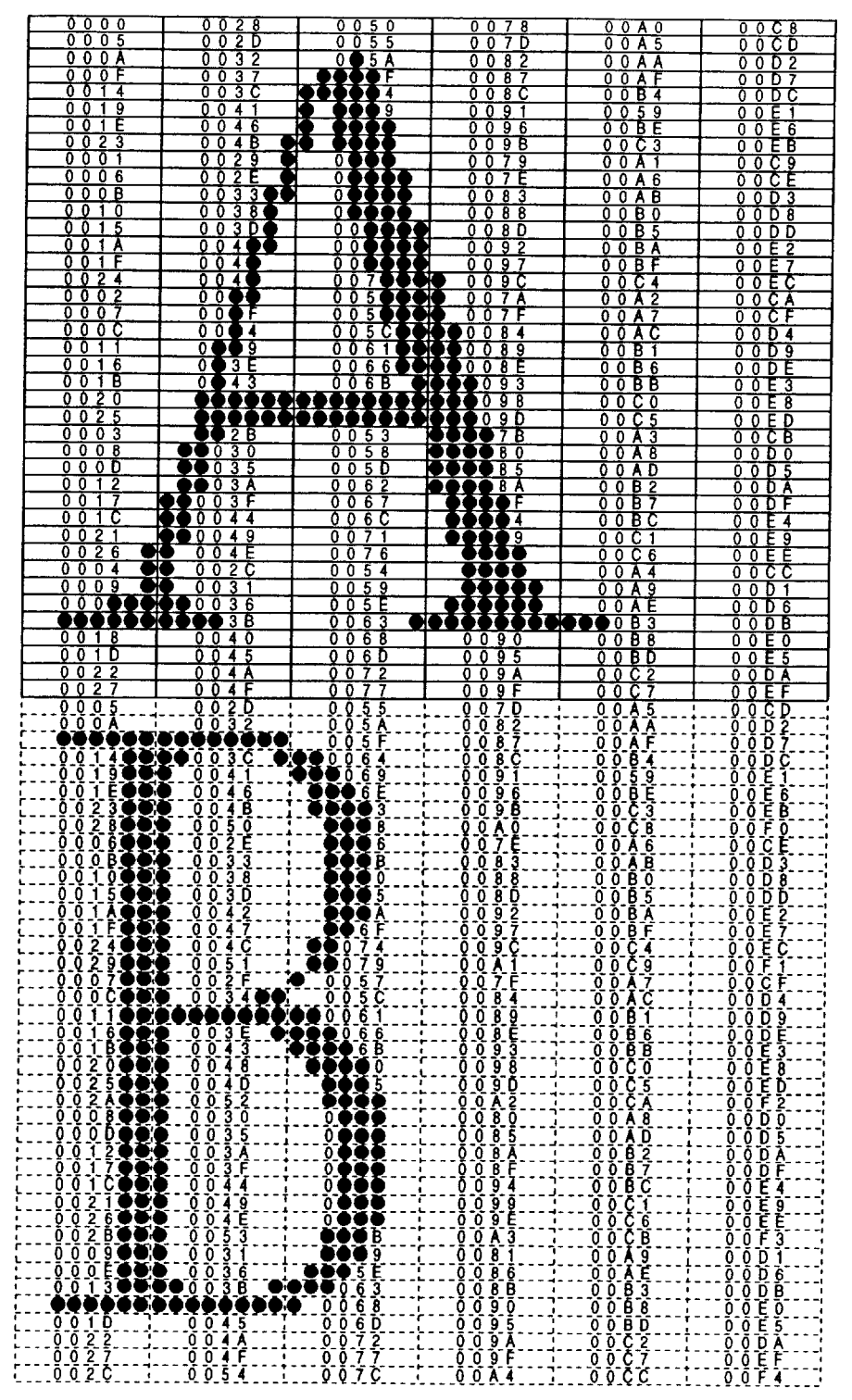

In FIG. 12, in the interface DMA block 105 (refer to FIG. 3), "0000H" is set to the start address 204, "1" is set to the vertical counter 201, and "128" is set to the horizontal counter 202. Record data is received and stored in DRAM 106 as shown in FIG. 13. Reference numeral 107 represents a conversion circuit block (HVDMA block) which performs an image data H/V conversion and DMA.

FIG. 13 shows the record data structure of DRAM 106 shown in FIG. 12.

In FIG. 13, data of vertical one dot and horizontal 1024dots supplied from the interface is stored in DRAM 106 to make it have the data structure shown in FIG. 13. Thereafter, an HV conversion to be described later is executed to make the data have the data structure same as that shown in FIG. 2. Therefore, as detailed in the first embodiment, data can be transferred to the recording heads at high speed.

Figure 14:
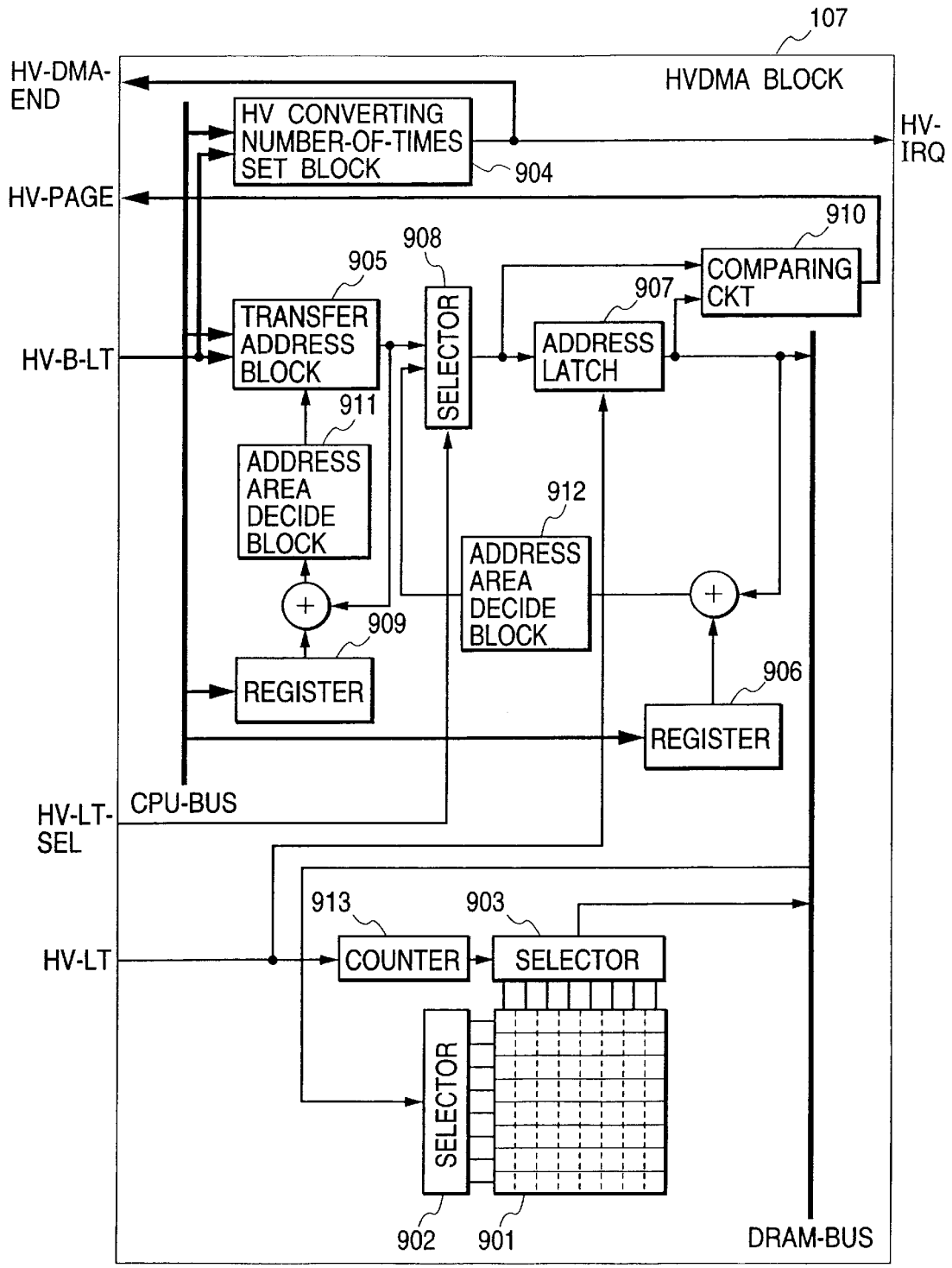
FIG. 14 is a block diagram showing the detailed structure of a conversion circuit block shown in FIG. 12.

FIG. 14 is a block diagram showing the detailed structure of the conversion circuit block 107 shown in FIG. 12.

As shown in FIG. 14, the conversion circuit block 107 reads vertical 8 bytes from the raster sequential data shown in FIG. 13 and stored in DRAM 106 show in FIG. 12, and writes them in an HV conversion register group 901. The HV conversion register group 901 is connected to the data bus of DRAM 106 via a write selector 902 which selects a different location each time one byte is written and via a read selector 903 which selects a different location each time one byte is read. A 3-bit counter 913 generates a switching signal for the selectors 902 and 903 and counts up each time one byte data is transferred. By using the HV conversion register group 901, the written data can be read by rotating it by 90° in the clockwise direction. The HV conversion of 8×8 dots can be performed by obtaining the 8-byte addresses same as those of the 8-byte addresses in DRAM 106.

By using the size of 8×8 dots as the unit of one HV conversion, the data of 1024 dots in the horizontal width of one scan is subjected to HV conversion of 128 blocks. Therefore, "128" is set to a block 904 for setting the number of HV conversions. Next, the transfer start address ("0000H" in the example shown in FIG. 13) is set to a transfer address block 905, and "0005H" is set to a register 906 which stores an address addition value. Therefore, the addresses of vertical 8 bytes are sequentially stored in an address latch 907 in the order of "0000H", "0005H", . . . , "001EH" and "0023H". Each time the data at each address is output to the DRAM data bus, it is written in the HV conversion register group 901.

Similarly, in writing HV converted data into DRAM 106, an address output from the transfer address block is latched by the address latch 907. A sequencer 110 supplies via an HV-LT signal line a latch timing of the address latch 907 and a count-up timing (i.e., data read/write timing of one byte) of the counter 913.

During the HV conversion of one unit of 8 bytes, the selector 908 for switching between the address data after addition and the value set to the transfer address block selects always the address data after addition. Thereafter, the address same as that used when data is written in the HV conversion register group 901 is generated in accordance with the addition value set to the addition value register 906.

After the HV conversion of one unit is completed, the next horizontal block address is output. For example, if the addition value in the register 909 is "0028H", then "0028H" is set to the transfer address block 905 as the start address of the next HV conversion block to follow the HV conversion.

After the HV conversion is completed for 128 HV conversion blocks, an HV DMA completion interrupt occurs to notify CPU 102 of the completion of HV conversion of vertical 8 dots and horizontal 1024 dots. Since the next address is present at the input side of the address latch 907, the upper bits of the addresses at the input and output sides thereof are compared by a comparing circuit 910. An output of the comparing circuit is used for judging whether a fast page mode of DRAM 106 is possible. An arbiter block 111 controls to switch between the fast page mode access and a normal memory access.

If a calculated address exceeds a memory data storage area, the address is required to take an initial value. To this end, the address area decision blocks 911 and 912 are inserted after the calculation blocks. Upon reception of the interrupt signal, CPU 102 sets the transfer address initial value "0001H" for the selector 902 in order to perform the HV conversion of the next area, with the other setting values being set in the manner described above. With the HV conversion described above, the image data shown in FIG. 13 is changed to that shown in FIG. 2.

As described above, referring to FIG. 12, the interface block 104 receives data including image data and temporarily stores it. CPU 102 analyzes (refer to a data path G1) control codes contained in the temporarily stored data and transfers (refer to a data path G2) only the image data to a print buffer assigned to DRAM 106 by controlling the interface DMA block 105. Data in the print buffer of DRAM 106 is read (refer to a data path G4) by the HVDMA block 107, and after data conversion, it is again written in the print buffer (refer to a data path G5).

Figure 15:
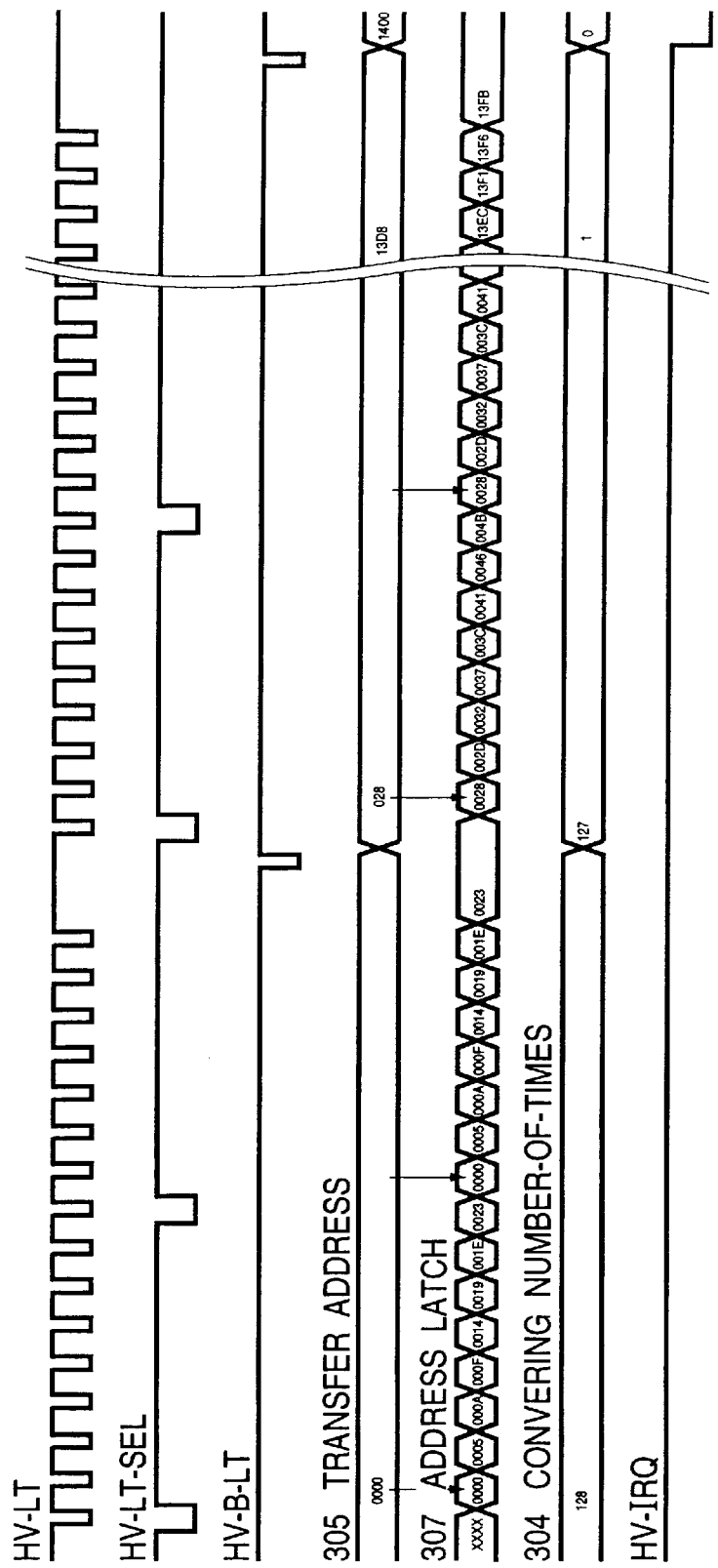
FIG. 15 is a timing chart illustrating the operation of the conversion circuit block shown in FIG. 12.

FIG. 15 is a timing chart illustrating the operation of the HVDMA block 107 shown in FIG. 12. Like elements to those shown in FIG. 14 are represented by using identical reference numerals and names.

As shown in FIG. 15, at the same time when the HVDMA block 107 completes the HV conversion (in this example, 128 times), the signal HV-LT of eight pulses is generated. When, at the first pulse timing of the eight pulses, a signal HV-LT-SEL takes a "low" state, the value (initial value "0") set to the transfer address block 905 is latched by the address latch 907. When at the following seven-pulse timings, the signal HV-LT-SEL takes a "high" state at each pulse timing, the address added to the first address addition value (in this example, "5") in the register 906 is latched by the address latch 907.

When, at the first pulse timing of the next eight pulses, the signal HV-LT-SEL again takes the "low" state, a value (in this example, "0") same as that latched at the first pulse timing of the preceding eight pulses is latched. At the timing after the 16-pulse timings, one pulse is generated on a signal line HV-B-LT. At this timing, a value added to the second address addition value (set to the register 909, and in this example, "28H") is latched at the transfer address block 905. At the same time, a counter in the block 904 for counting the HV conversion number is decremented by "1" and changed to "127".

At the timing after a series of operations described above is executed necessary times, the counter in the block 904 takes a value "0" and a signal HV-IRQ is generated.

With the above control, the data structure same as that shown in FIG. 2 is formed in the print buffer. Thereafter, the setting and operation of the head DMA block 108 and image data conversion block 109 are performed in the manner similar to the first embodiment so that data can be transferred to the recording heads at high speed.

[Third Embodiment]

Figure 16:
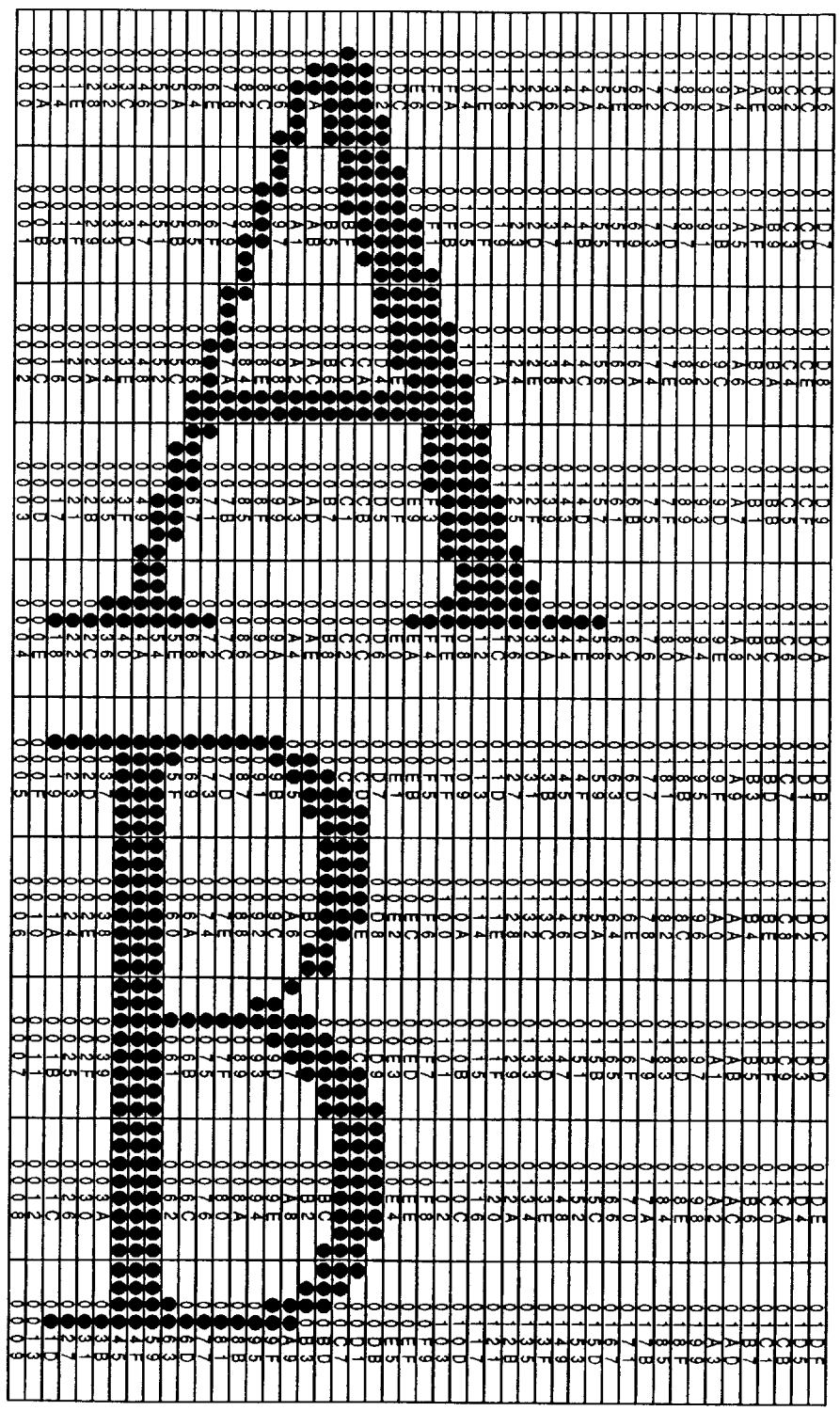
FIG. 16 is a diagram showing a record data map of a record control apparatus according to a third embodiment of the invention.
Figure 17:
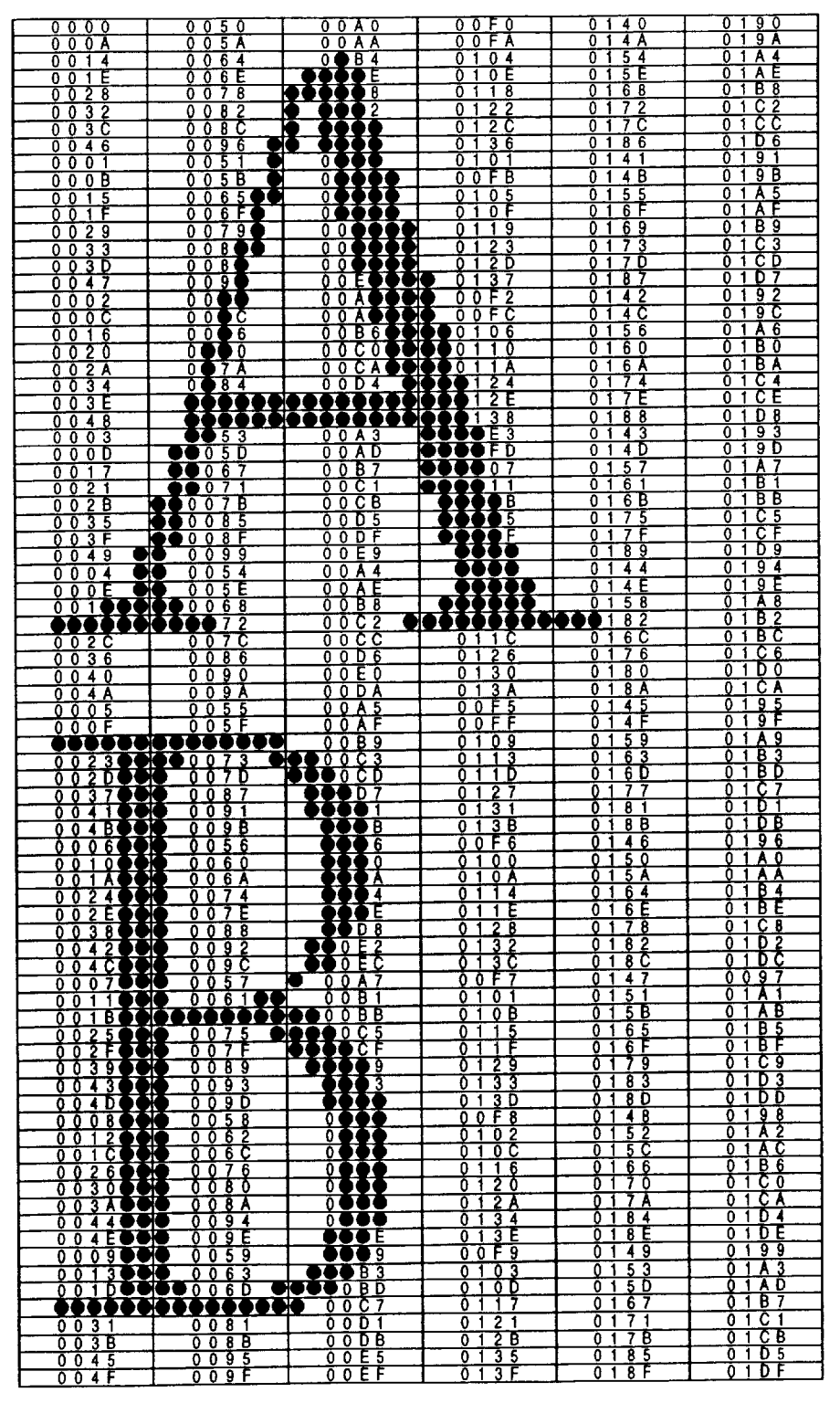

FIGS. 16 and 17 are diagrams showing the data structure used by a record control apparatus according to the third embodiment of the invention.

In the second embodiment, in the operations of the interface DMA block 105 and HVDMA block 107, the number of DMA transfers is calculated assuming that the number of dots in the horizontal direction is "1024" (the maximum horizontal width which the record control apparatus can record). Since a value indicating the number of dots in the horizontal direction is contained in the control code supplied from the interface, the print buffer may be configured in accordance with this value. For example, if the number of dots in the horizontal width is "512", the data structure in the print buffer sufficient for the data capacity of "512" becomes as shown in FIG. 16. In order to realize this data structure, if data of vertical eight dots is supplied (if HV conversion is not necessary), then the vertical counter 201 of the interface DMA block 105 is set with "512" as the number of DMA transfers. Next, "0AH" is set to the data latch 203 of the interface DMA block as the first address addition value.

Next, "0AH" is set to the register 410 of the head DMA block 108 as the address addition value. Namely, the number of DMA transfers by the interface block 104 corresponds to the number of dots in the horizontal width. The first address addition value set to the register 208 of the interface DMA block 105 is equal to the second address addition value set to the register 410 of the head DMA block 108, and this address addition value X can be calculated from the following equation:

$$X = A/B = 5120/512 = 10 = (\text{``0AH''})$$

where A is the capacity of a print buffer assigned to each recording head, and B is the number of dots in the horizontal width.

If data of vertical one dot is supplied (refer to FIG. 17) (if HV conversion is necessary), then the vertical counter 201 of the interface DMA block 105 is set with "64" as the number of DMA transfers. Next, "50H" is set to the register 208 of the interface DMA block 105 as the first address addition value. Next, "64" is set to the HV conversion number block 904 of the HVDMA block 107. Next, "0AH" is set to the register 906 of the HVDMA block 107 as the first address addition value. Next, "50H" is set to the register 906 of the HVDMA block 107 as the second address addition value. Next, "0AH" is set to the register 410 of the head DMA block 108 as the second address addition value.

Namely, the number of DMA transfers by the interface DMA block 105 is equal to that in the HV conversion number block 904 of the HVDMA block 107. This number is calculated from the number of dots in the horizontal width divided by 8. The address addition value in the register 906 of the HVDMA block 107 is equal to the address addition value in the register 410 of the head DMA block 108. This address addition value X can be calculated from the following equation:

$$X=A/B=5120/512=10=(\text{``0AH''})$$

where A is the capacity of a print buffer assigned to each recording head, and B is the number of dots in the horizontal width. The first address addition value set to the register 208 of the interface DMA block 105 is equal to the second address addition value set to the register 909 of the HVDMA block 107. This address addition value Y can be calculated from $Y=X\times 8=10\times 8=80=(\text{``50H''})$.

[Fourth Embodiment]

The first to third embodiments can deal with the data supplied from the interface and having the data structure of vertical 8 dots×horizontal width or a data structure of one dot vertically×horizontal width. For the data structure having the optional number of vertical dots, the following change becomes necessary. This embodiment will be described.

In the second embodiment, in the interface DMA block 105 shown in FIG. 12, "1" is set to the vertical counter 201, "128" is set to the horizontal counter 202, "1" is set to the register 208 as the first address addition value, and "28H" is set to the register 211 as the second address addition value. The data may also be stored in the print buffer by setting "128" to the vertical counter 201, "1" to the horizontal counter 202, "28H" to the register 208 as the first address addition value, and "1" to the register 211 as the second address addition value. Therefore, if the data structure is vertical 4 dots×horizontal 1024 dots, "4" is set to the horizontal counter to realize the data structure shown in FIG. 12.

[Other Embodiment]

Figure 18:
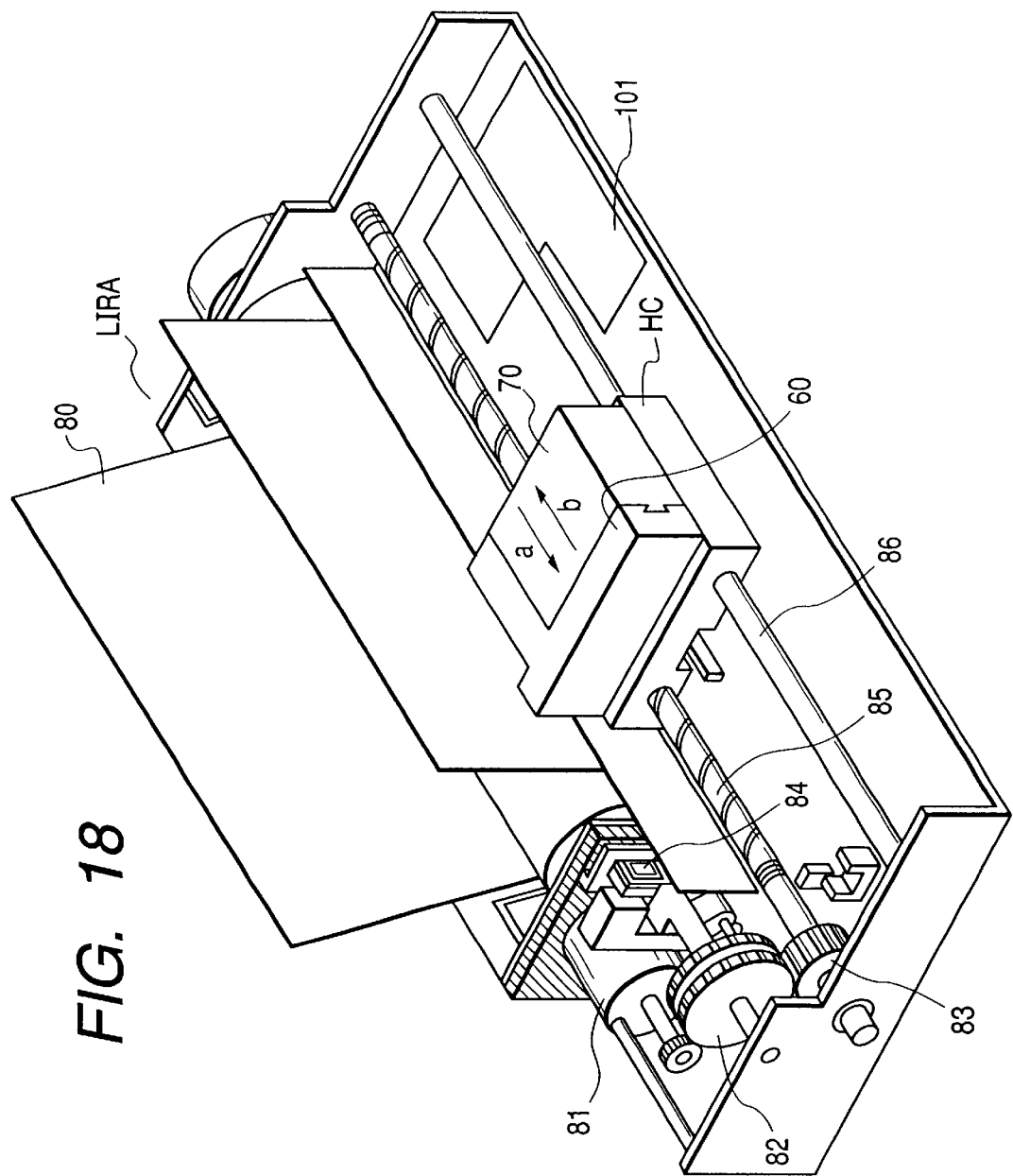
FIG. 18 is a diagram showing a recording apparatus using the record control apparatus of the invention.
Figure 19:
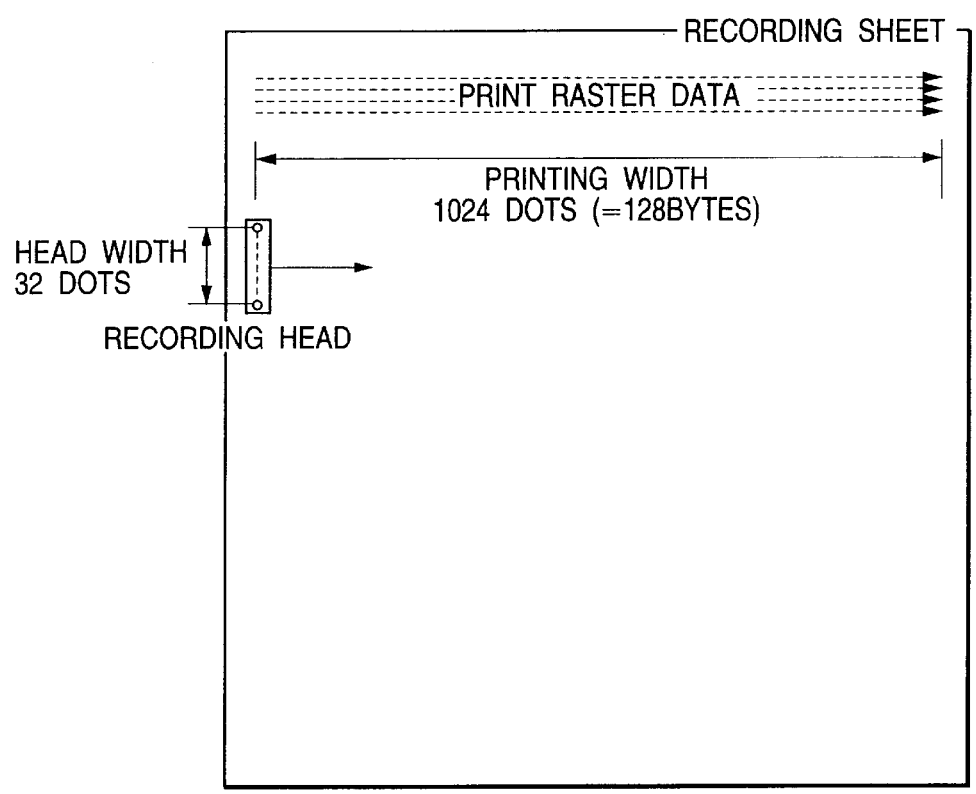
FIG. 19 is a schematic diagram illustrating a conventional record operation of a recording head of a recording apparatus.
Figure 20:
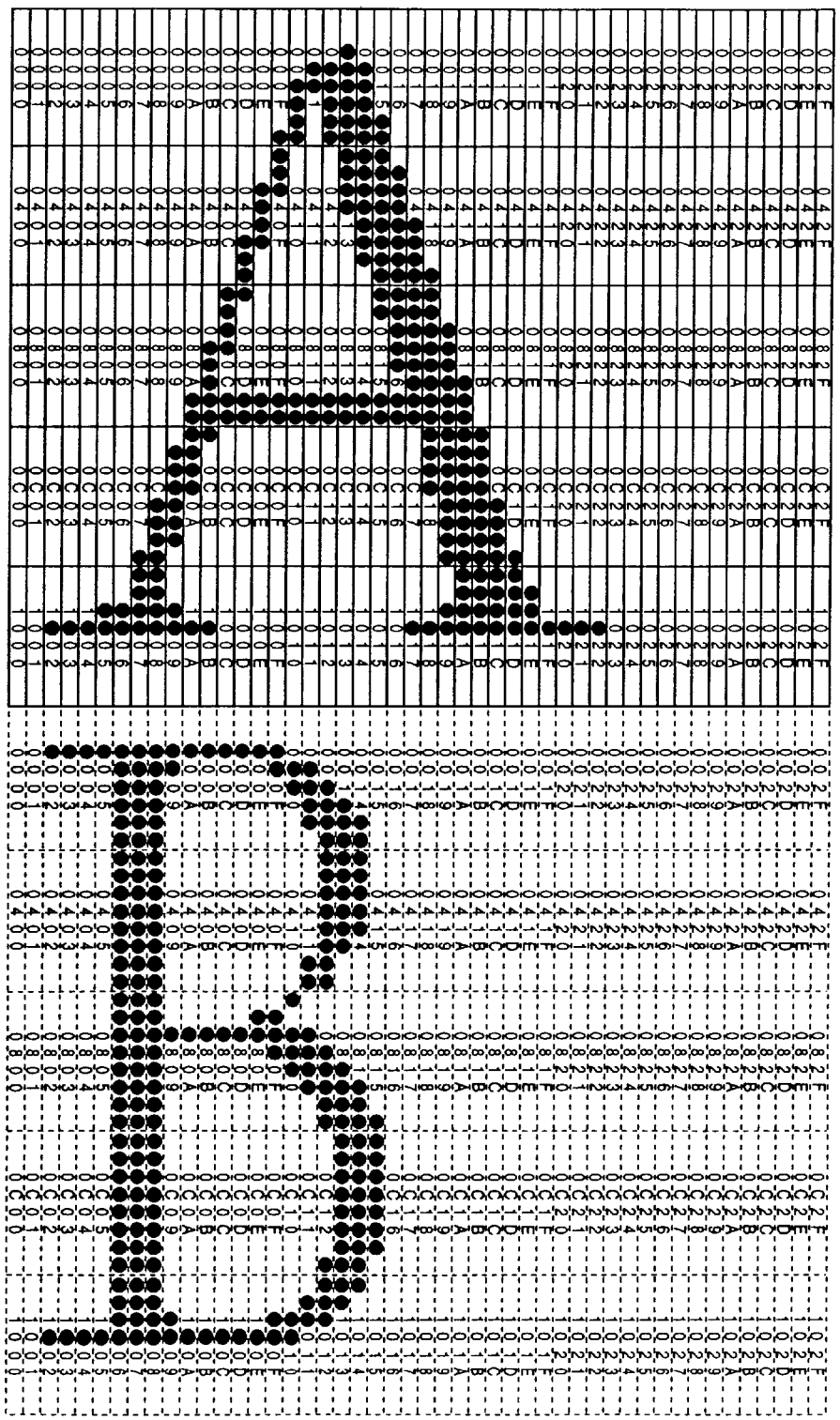
FIG. 20 is a memory map of a storage medium which stores record data to be recorded with a recording apparatus of this type.
Figure 21:
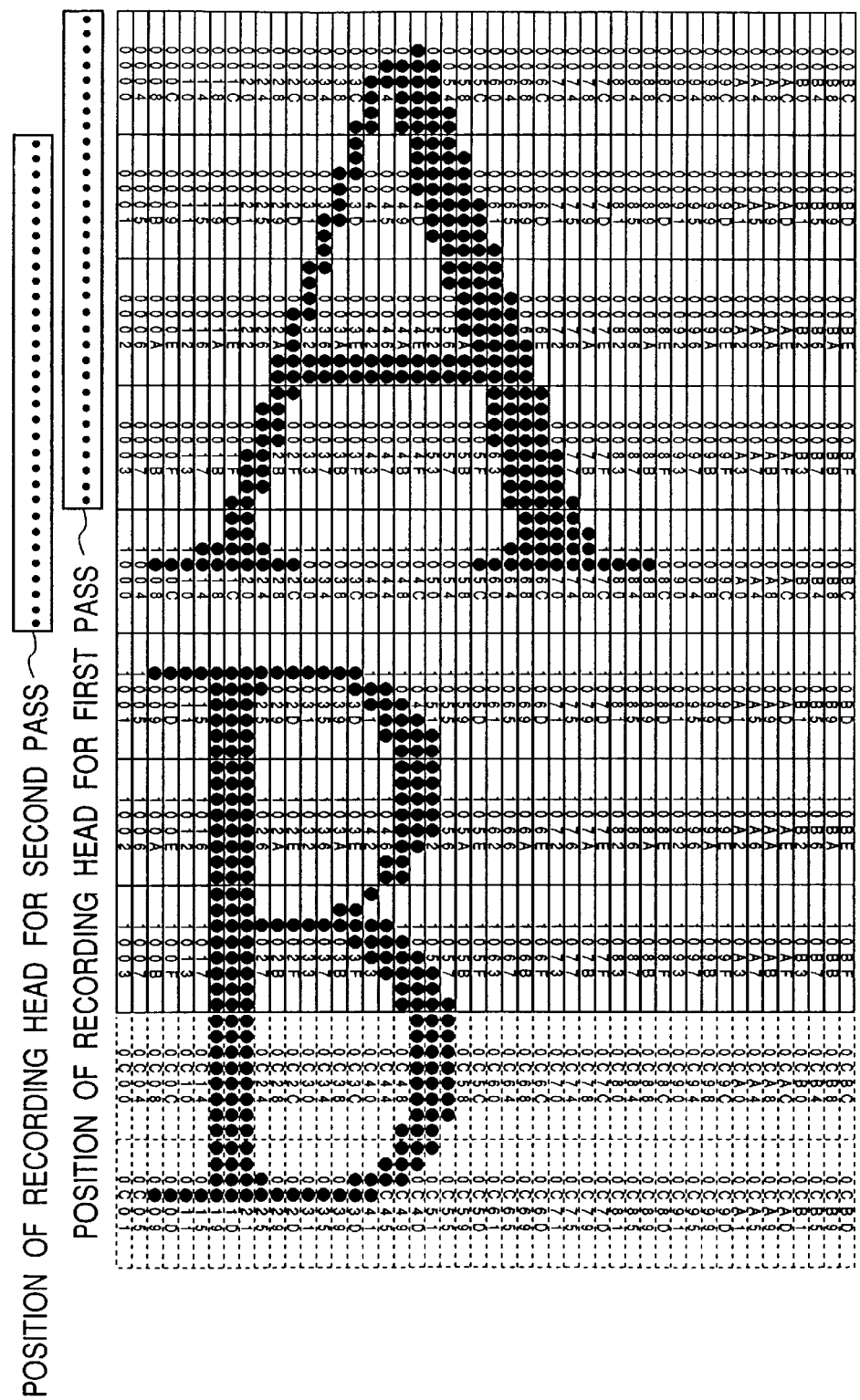
FIG. 21 is a memory map of another storage medium which stores record data to be recorded with a recording apparatus of this type.

FIG. 18 shows a recording apparatus having a print buffer control apparatus 101 structured in the manner described with the above embodiments.

This recording apparatus also includes a record head cartridge on a carriage HC having an ink tank 70 and a recording head 60 both being removable, a motor 81 as a driving source for driving a transport roller and the like for transporting the carriage and recording medium 80, a carriage shaft 85 for transmitting a power from the drive source to the carriage, and the like.

The recording head may be a bubble jet type in which a bubble is formed by heating ink in a flow path to eject ink from an ejection port or an ink jetting type in which ink is jetted by driving a piezoelectric element.

As described so far, according to the record control apparatus of this invention, it is possible to develop image data of m consecutive vertical dots×n horizontal dots on a print buffer so as to provide an optimum address state for printing by recording heads. The developed image data can be read at high speed even from DRAM and transferred to the recording head to realize high speed printing.

It is also easy to change the data structure of a print buffer in accordance with the horizontal width of image data and use the print data efficiently.

What is claimed is:

1. A record control apparatus for controlling to write record data into at least one print buffer, the record data being recorded with recording head reciprocally moving on a recording medium, said record control apparatus comprising:

reception means for receiving input record information;

developing means for transferring image data of consecutive vertical m dots×horizontal n dots contained in the record information received by said reception means to the at least one print buffer at discrete addresses to develop the image data on the at least one print buffer, wherein the transfer of the image data from said reception means into the at least one print buffer is directly performed; and data transfer means for reading the image data in the at least one print buffer at addresses consecutive in such a direction that crosses a direction of the movement of the recording and transferring the read image data to the recording head.

2. A record control apparatus for controlling to write record data into at least one print buffer, the record data being recorded with recording head reciprocally moving on a recording medium, said record control apparatus comprising:

reception means for receiving input record information;

developing means for transferring image data of m consecutive vertical dots×n horizontal dots contained in the record information received by said reception means to the at least one print buffer at discrete addresses to develop the image data on the at least one print buffer, wherein the transfer of the image data from said reception means into the at least one print buffer is directly performed;

data conversion means for reading the image data of a predetermined number of blocks developed on the at least one print buffer by said developing means, and developing again the image data on the at least one print buffer by reversing the arrangement of horizontal and vertical direction elements; and data transfer means for reading the image data in the at least one print buffer developed again by said data conversion means at addresses consecutive in such a direction that crosses a direction of the movement of the recording head and transferring the read image data to the recording head.

3. A record control apparatus according to claim 1, wherein said development means comprises:

development start address setting means for setting an address at which first data is stored;

first count means for counting the number of times corresponding to a vertical data amount;

first discretely value setting means for setting a discretive value to be used for storing data discretely;

second count means for counting the number of times corresponding to a horizontal data amount;

second discrete value setting means for setting a discretive value to be used for storing data discretely;

latch means for temporarily latching a development address;

development address generating means for deciding as a storage address of the image data either a value set by said development start address setting means or a value obtained by sequentially adding the value set by said development start address setting means to the value set by said first discrete value setting means;

write means for writing a value obtained by adding the value set by said development start address setting means to the value set by said second discretive value setting means; and first signal generating means for notifying a computation processing unit of a count completion by said first count means and generating at the same time a first signal for stopping a DMA transfer.

4. A record control apparatus according to claim 3, wherein said write means comprises:
   address setting means for setting a start address and an end address for each area of the at least one print buffer;
   first decision means for deciding whether a value obtained by sequentially adding the value set by said development start address setting means to the value set by said first discrete value setting means exceeds the end address of a print buffer presently storing data;
   first calculating means for calculating an excessive value if said first decision means decides that the value exceeds the end address of the print buffer presently storing data;
   first selection means for using a value obtained by adding a value calculated by said first calculating means to the start address of the print buffer presently storing data, as the storage address of the image data;
   second decision means for deciding whether a value obtained by sequentially adding the value set by said development start address setting means to the value set by said second discrete value setting means exceeds the end address of the print buffer presently storing data;
   second calculating means for calculating an excessive value if said second decision means decides that the value exceeds the end address of the print buffer presently storing data; and
   second selection means for using a value obtained by adding a value calculated by said second calculating means to the start address of the print buffer presently storing data, as the storage address of the image data.

5. A record control apparatus according to claim 3, wherein if m of the image data of m consecutive vertical dots×n horizontal dots is a natural number multiple (H) of a data process bit width, said development start address setting means sets a value obtained by adding image data of the m vertical dots×n horizontal dots as the development start address.

6. A record control apparatus according to claim 3, wherein said development start address setting means sets a value obtained by sequentially adding a value L which is calculated from a calculation equation of L+c/b/n where c is the capacity of the print buffer, n is the number of dots in a horizontal width of the image data and b is the number of conversion registers.

7. A record control apparatus according to claim 3, wherein said data conversion means comprises:
   conversion start address setting means for setting an address at which first conversion data is stored;
   third discrete value setting means for setting a discrete value to be used for accessing data stored discretely at an address shifted by an amount corresponding to the number of conversion registers;
   conversion address generating means for generating as an access address either an address set by said conversion start address setting means or an address obtained by sequentially adding the first-mentioned address to the discrete value set by said third discrete value setting means;
   fourth discretive value setting means for setting a discrete value to be used for accessing data stored discretely at an address shifted by an amount corresponding to a data amount in a horizontal direction;
   write means for writing a value obtained by adding the address set by said conversion start address setting means to the discrete value set by said fourth discrete value setting means, in said conversion start address setting means;
   second count means for setting a number corresponding to a data amount in the horizontal direction and performing a count each time said write means writes the value in said conversion start address setting means; and
   second signal generating means for notifying a computation processing unit of a count completion by said second count means and generating at the same time a second signal for stopping a DMA transfer.

8. A record control apparatus according to claim 7, further comprising:
   third decision means for deciding whether a value obtained by sequentially adding the value set by said conversion start address setting means to the discrete value set by said third discrete value setting means exceeds the end address of a print buffer presently storing data;
   third calculating means for calculating an excessive value if said third decision means decides that the value exceeds the end address of the print buffer presently storing data;
   second selection means for using a value obtained by adding a value calculated by said third calculating means to the start address of the print buffer presently storing data, as the storage address of the image data;
   fourth decision means for deciding whether a value obtained by sequentially adding the value set by said conversion start address setting means to the value set by said fourth discrete value setting means exceeds the end address of the print buffer presently storing data;
   fourth calculating means for calculating an excessive value if said fourth decision means decides that the value exceeds the end address of the print buffer presently storing data; and
   third selection means for using a value obtained by adding a value calculated by said fourth calculating means to the start address of the print buffer presently storing data, as the storage address of the image data.

9. A record control apparatus according to any one of claims 1, 2, 4, 6 and 8, wherein the printer buffers are made of memory devices having a relatively high access speed when data is read or written at consecutive addresses or adjacent addresses.

10. A recording apparatus for printing record data on a recording medium by scanning recording head, said recording apparatus comprising:
   a carriage for mounting and scanning the recording head; and
   a record control apparatus for controlling to write record data in a at least one print buffer, the record data being printed by the recording head,
   wherein said record control apparatus comprises:
   reception means for receiving input record information;
   developing means for transferring image data of m consecutive vertical dots×n horizontal dots contained in the record information received by said reception means to the at least one print buffer at discrete addresses to develop the image data on the at least one print buffer, wherein the transfer of the image data from said reception means into the at least one print buffer is directly performed; and
   data transfer means for reading the image data in the at least one print buffer at addresses consecutive in such a direction that crosses a direction of the movement of the recording head and transferring the read image data to the recording head.

11. A recording apparatus for printing record data on a recording medium by scanning recording head, said recording apparatus comprising:

a carriage for mounting and scanning the recording head; and a record control apparatus for controlling to write record data in a at least one print buffer, the record data being printed by the recording head, wherein said record control apparatus comprises:

reception means for receiving input record information;

developing means for transferring image data of m consecutive vertical dots×n horizontal dots contained in the record information received by said reception means to the at least one at least one print buffer at discrete addresses to develop the image data on the at least one print buffer, wherein the transfer of the image data from said reception means into the at least one print buffer is directly performed;

data conversion means for reading the image data of a predetermined number of blocks developed on the at least one print buffer by said developing means, and developing again the image data on the at least one print buffer by reversing the arrangement of horizontal and vertical direction elements; and data transfer means for reading the image data in the at least one print buffer developed again by said data conversion means at addresses consecutive in such a direction that crosses a direction of the movement of the recording head and transferring the read image data to the recording head.

12. A record control apparatus according to claim 1, wherein said data transfer means is a means for performing DMA transfer of the image data.

13. A record control apparatus according to claim 2, wherein said data transfer means is a means for performing DMA transfer of the image data.

14. A recording apparatus according to claim 10, wherein said data transfer means is a means for performing DMA transfer of the image data.

15. A recording apparatus according to claim 11, wherein said data transfer means is a means for performing DMA transfer of the image data.

16. A control apparatus for controlling the writing of record data to be recorded with a recording head into a print buffer adapted for memorizing the record data therein, said control apparatus comprising:

storing means for temporarily storing record information;

developing means for transferring image data read out at consecutive addresses from said storing means to the print buffer at discrete addresses, and developing the image data on the print buffer; and data transfer means for reading the image data in the print buffer at consecutive addresses in a direction corresponding to a nozzle array direction of the reading head, and transferring the image data to the recording head.

17. A control apparatus for controlling the writing of record data to be recorded with a recording head, into a print buffer adapted for memorizing the record data therein, said control apparatus comprising;

storing means for temporarily storing record information;

developing means for transferring image data read out at consecutive addresses from said storing means to the print buffer at discrete addresses, and developing the image data on the print buffer;

data conversion means for reading out the image developed on the print buffer, in predetermined units, reversing arrangements between horizontal and vertical components of the image data, and re-developing the converted image data on the present buffer; and data transfer means for reading the image data re-developed on the print buffer at consecutive addresses in a direction corresponding to a nozzle array direction of the recording head, and transferring the image data to the recording head.

18. A control apparatus for controlling the writing of record data to be recorded with a recording head into a print buffer adapted for memorizing the record data therein, said control apparatus comprising:

a storing medium for temporarily storing record information;

a developing unit adapted to transfer image data read out at consecutive addresses from said storing medium to the print buffer at discrete addresses, and develop the image data on the print buffer, and a data transfer unit adapted to read the image data in the print buffer at consecutive addresses in a direction corresponding to a nozzle array direction of the reading head, and transfer the image data to the recording head.

19. A control apparatus for controlling the writing of record data to be recorded with a recording head, into a print buffer adapted for memorizing the record data therein, said control apparatus comprising:

a storing medium for temporarily storing record information;

a developing unit adapted to transfer image data read out at consecutive addresses from said storing medium to the print buffer at discrete addresses, and develop the image data on the print buffer;

a data conversion unit adapted to read out the image developed on the print buffer, in predetermined units, reverse arrangements between horizontal and vertical components of the image data, and re-develop the converted image data on the present buffer; and a data transfer unit, arranged to read the image data re-developed on the print buffer at consecutive addresses in a direction corresponding to a nozzle array direction of the recording head, and transfer the image data to the recording head.

* * * * *

UNITED STATES PATENT AND TRADEMARK OFFICE
CERTIFICATE OF CORRECTION

| | | |
|---|---|---|
| PATENT NO. | : 6,897,976 B2 | Page 1 of 4 |
| APPLICATION NO. | : 09/354726 | |
| DATED | : May 24, 2005 | |
| INVENTOR(S) | : Souhei Tanaka et al. | |

It is certified that error appears in the above-identified patent and that said Letters Patent is hereby corrected as shown below:

( * ) NOTICE

Insert --This patent issued on a continued prosecution application filed under 37 CFR 1.53(d), and is subject to the twenty year patent term provisions of 35 U.S.C. 154(a)(2).--.

SHEET 15

FIG. 15, "CONVERING" should read --CONVERTING--.

COLUMN 1

Line 44, ""OOOOH"" should read --0000H"--.
    Line 64, ""OOOH"," should read --"0001H",--.

COLUMN 2

Line 33, "date" should read --data--.
    Line 58, "consecutive vertical m dots x horizontal n" should read
        --m consecutive vertical dots x n horizontal--.

COLUMN 3

Line 6, "consecutive vertical m dots x horizontal" should read
        --m consecutive vertical dots x n horizontal--.
    Line 7, "n" should be deleted.
    Line 41, "Image" should read --image--.

COLUMN 4

Line 45, ""OOOOH"" should read --0000H"--.
    Line 50, ""3COOH" should read --3C00H"--.
    Line 59, "vertical 40" should read --40 vertical --.
    Line 67, ""OOOOH"," should read --"0000H",--.

UNITED STATES PATENT AND TRADEMARK OFFICE
CERTIFICATE OF CORRECTION

PATENT NO. : 6,897,976 B2
APPLICATION NO. : 09/354726
DATED : May 24, 2005
INVENTOR(S) : Souhei Tanaka et al.

It is certified that error appears in the above-identified patent and that said Letters Patent is hereby corrected as shown below:

COLUMN 5

Line 8, "addresses from "OOOH"" should read --address from "0000H"--.
Line 11, ""OOOAH"," should read --"000AH",--.
Line 12, ""OOOOFH", ...." should read --"000FH",....--.
Line 30, "byte" should read --byte of--.

COLUMN 6

Line 3, "store" should read --stored--.
Line 11, "subtractor" should read --subtracter--.
Line 16, "subtractor 303" should read --subtracter 303--.
Line 22, "subtractor 304" should read --subtracter 304--.
Line 26, "subtractor 304" should read --subtracter 304--.
Line 33, "vertical 32 bits and horizontal 1024" should read
    --32 vertical bits and 1024 horizontal--.
Line 34, "bits" should read --bits are--.
Line 36, ""OOOOH"" should read --"0000H"--.
Line 43, "vertical 32" should read --32 vertical--.

COLUMN 8

Line 1, "subtractor 511" should read --subtracter 511--.
Line 5, "subtractor 511" should read --subtracter 511--.
Line 13, "subtractor 513" should read --subtracter 513--.
Line 14, "subtractor" should read --subtracter--.
Line 18, "subtractor 304" should read --subtracter 304--.

COLUMN 9

Line 1, "subtractor" should read --subtracter--.
Line 6, "subtractor 703" should read --substrater 703--.
Line 10, "subtractor 705" should read --subtracter 705--.
Line 15, "subtractor 705" should read --subtracter 705--.
Line 46, "vertical" should read --32 vertical--.
Line 47, "32 dots and horizontal 1024" should read
--dots and 1024 horizontal--.

UNITED STATES PATENT AND TRADEMARK OFFICE
CERTIFICATE OF CORRECTION

| | | |
|---|---|---|
| PATENT NO. | : 6,897,976 B2 | |
| APPLICATION NO. | : 09/354726 | |
| DATED | : May 24, 2005 | |
| INVENTOR(S) | : Souhei Tanaka et al. | |

It is certified that error appears in the above-identified patent and that said Letters Patent is hereby corrected as shown below:

COLUMN 10

Line 6, "Recording" should read --recording--.
Line 28, "vertical one dot and horizontal" should read
 --one vertical dot, and 1024 horizontal--.
Line 29, "1024dots" should read --dots--.
Line 39, "vertical 8" should read --8 vertical--.
Line 61, "vertical 8" should read --8 vertical--.

COLUMN 11

Line 14, ""OO28H" should read --"0028H"--.
Line 18, "HV DMA" should read --HVDMA--.
Line 20, "vertical 8 dots and horizontal 1024 "should read
 --8 vertical dots and 1024 horizontal--.

COLUMN 12

Line 32, "vertical eight" should read --eight vertical--.
Line 52, "vertical one" should read --one vertical--.

COLUMN 13

Line 17, "having the" should read --having a--.
Line 18, "vertical 8" should read --8 vertical--.
Line 33, "vertical 4 dots and horizontal 1024" should read
 --4 vertical dots and 1024 horizontal--.

COLUMN 14

Line 2, "consecu-" should read --m consecu---.
Line 3, "tive vertical m dots x horizontal n" should read
 --tive vertical dots x n horizontal--.
Line 47, "discretely" should read --discrete--.

COLUMN 15

Line 43, "L+c/b/n" should read --L=c/b/n--.
Line 62, "discretive" should read --discrete--.

UNITED STATES PATENT AND TRADEMARK OFFICE
CERTIFICATE OF CORRECTION

PATENT NO. : 6,897,976 B2
APPLICATION NO. : 09/354726
DATED : May 24, 2005
INVENTOR(S) : Souhei Tanaka et al.

It is certified that error appears in the above-identified patent and that said Letters Patent is hereby corrected as shown below:

COLUMN 16

Line 53, "a" should be deleted.

COLUMN 17

Line 9, "a" should be deleted.
    Line 16, "at least one" (first occurrence) should be deleted.

COLUMN 18

Line 31, "buffer, and" should read --buffer; and--.

Signed and Sealed this

Eighth Day of August, 2006

JON W. DUDAS
*Director of the United States Patent and Trademark Office*